(12) United States Patent
Xu et al.

(10) Patent No.: US 11,054,932 B2
(45) Date of Patent: Jul. 6, 2021

(54) ELECTRONIC DEVICE HAVING A TOUCH SENSOR, FORCE SENSOR, AND HAPTIC ACTUATOR IN AN INTEGRATED MODULE

(71) Applicant: Apple Inc., Cupertino, CA (US)

(72) Inventors: Qiliang Xu, Livermore, CA (US); Alex J. Lehmann, Sunnyvale, CA (US); Ming Yu, Saratoga, CA (US); Xianwei Zhao, Fremont, CA (US); Xiaonan Wen, San Jose, CA (US); Shan Wu, Cupertino, CA (US); Xiaofan Niu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/102,557

(22) Filed: Aug. 13, 2018

(65) Prior Publication Data

US 2019/0073079 A1    Mar. 7, 2019

Related U.S. Application Data

(60) Provisional application No. 62/555,019, filed on Sep. 6, 2017.

(51) Int. Cl.
| | | |
|---|---|---|
| *G06F 3/041* | (2006.01) | |
| *G06F 3/044* | (2006.01) | |
| *G06F 3/01* | (2006.01) | |
| *G06F 3/045* | (2006.01) | |
| *G06F 3/0354* | (2013.01) | |

(52) U.S. Cl.
CPC ............ *G06F 3/0416* (2013.01); *G06F 3/016* (2013.01); *G06F 3/045* (2013.01); *G06F 3/0443* (2019.05); *G06F 3/0448* (2019.05); *G06F 2203/04105* (2013.01)

(58) Field of Classification Search
USPC ......................................................... 345/174
See application file for complete search history.

(56) References Cited

U.S. PATENT DOCUMENTS

| | | | |
|---|---|---|---|
| 5,196,745 | A | 3/1993 | Trumper et al. |
| 5,293,161 | A | 3/1994 | MacDonald et al. |
| 5,424,756 | A | 6/1995 | Ho et al. |
| 5,434,549 | A | 7/1995 | Hirabayashi et al. |

(Continued)

FOREIGN PATENT DOCUMENTS

| | | |
|---|---|---|
| CN | 101036105 | 9/2007 |
| CN | 201044066 | 4/2008 |

(Continued)

OTHER PUBLICATIONS

Author Unknown, "3D Printed Mini Haptic Actuator," Autodesk, Inc., 16 pages, 2016.

(Continued)

*Primary Examiner* — Chineyere D Wills-Burns
(74) *Attorney, Agent, or Firm* — Brownstein Hyatt Farber Schreck, LLP

(57) ABSTRACT

An electronic device includes an input device. The input device has an input/output module below or within a cover defining an input surface. The input/output module detects touch and/or force inputs on the input surface, and provides haptic feedback to the cover. In some instances, a haptic device is integrally formed with a wall or structural element of a housing or enclosure of the electronic device.

18 Claims, 22 Drawing Sheets

(56) References Cited

U.S. PATENT DOCUMENTS

| | | |
|---|---|---|
| 5,436,622 A | 7/1995 | Gutman et al. |
| 5,668,423 A | 9/1997 | You et al. |
| 5,842,967 A | 1/1998 | Kroll |
| 5,739,759 A | 4/1998 | Nakazawa et al. |
| 6,084,319 A | 7/2000 | Kamata et al. |
| 6,342,880 B2 | 1/2002 | Rosenberg et al. |
| 6,373,465 B2 | 4/2002 | Jolly et al. |
| 6,388,789 B1 | 5/2002 | Bernstein |
| 6,438,393 B1 | 8/2002 | Surronen |
| 6,445,093 B1 | 9/2002 | Binnard |
| 6,493,612 B1 | 12/2002 | Bisset et al. |
| 6,554,191 B2 | 4/2003 | Yoneya |
| 6,693,622 B1 | 2/2004 | Shahoian et al. |
| 6,777,895 B2 | 8/2004 | Shimoda et al. |
| 6,822,635 B2 | 11/2004 | Shahoian |
| 6,864,877 B2 | 3/2005 | Braun et al. |
| 6,952,203 B2 | 10/2005 | Banerjee et al. |
| 6,988,414 B2 | 1/2006 | Ruhrig et al. |
| 7,068,168 B2 | 6/2006 | Girshovich et al. |
| 7,080,271 B2 | 7/2006 | Kardach et al. |
| 7,126,254 B2 | 10/2006 | Nanataki et al. |
| 7,130,664 B1 | 10/2006 | Williams |
| 7,196,688 B2 | 3/2007 | Shena et al. |
| 7,202,851 B2 | 4/2007 | Cunningham et al. |
| 7,234,379 B2 | 6/2007 | Claesson et al. |
| 7,253,350 B2 | 8/2007 | Noro et al. |
| 7,276,907 B2 | 10/2007 | Kitagawa et al. |
| 7,323,959 B2 | 1/2008 | Naka et al. |
| 7,336,006 B2 | 2/2008 | Watanabe et al. |
| 7,339,572 B2 | 3/2008 | Schena |
| 7,355,305 B2 | 4/2008 | Nakamura et al. |
| 7,360,446 B2 | 4/2008 | Dai et al. |
| 7,370,289 B1 | 5/2008 | Ebert et al. |
| 7,392,066 B2 | 6/2008 | Hapamas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,656,388 B2 | 2/2010 | Schena et al. |
| 7,667,371 B2 | 2/2010 | Sadler et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,911,328 B2 | 3/2011 | Luden et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynanen et al. |
| 8,002,089 B2 | 8/2011 | Jasso et al. |
| 8,020,266 B2 | 9/2011 | Ulm et al. |
| 8,040,224 B2 | 10/2011 | Hwang |
| 8,053,688 B2 | 11/2011 | Conzola et al. |
| 8,063,892 B2 | 11/2011 | Shahoian |
| 8,072,418 B2 | 12/2011 | Crawford et al. |
| 8,081,156 B2 | 12/2011 | Ruettiger |
| 8,125,453 B2 | 2/2012 | Shahoian et al. |
| 8,154,537 B2 | 4/2012 | Olien et al. |
| 8,174,495 B2 | 5/2012 | Takashima et al. |
| 8,174,512 B2 | 5/2012 | Ramstein et al. |
| 8,188,989 B2 | 5/2012 | Levin |
| 8,169,402 B2 | 6/2012 | Shahoian et al. |
| 8,217,892 B2 | 7/2012 | Meadors |
| 8,217,910 B2 | 7/2012 | Stallings et al. |
| 8,232,494 B2 | 7/2012 | Purcocks |
| 8,248,386 B2 | 8/2012 | Harrison |
| 8,253,686 B2 | 8/2012 | Kyung |
| 8,262,480 B2 | 9/2012 | Cohen et al. |
| 8,264,465 B2 | 9/2012 | Grant et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,572 B2 | 3/2013 | Marsden et al. |
| 8,390,594 B2 | 3/2013 | Modarres et al. |
| 8,400,027 B2 | 3/2013 | Dong et al. |
| 8,405,618 B2 | 3/2013 | Colgate et al. |
| 8,421,609 B2 | 4/2013 | Kim et al. |
| 8,432,365 B2 | 4/2013 | Kim et al. |
| 8,469,806 B2 | 6/2013 | Grant et al. |
| 8,471,690 B2 | 6/2013 | Hennig et al. |
| 8,493,177 B2 | 7/2013 | Flaherty et al. |
| 8,493,189 B2 | 7/2013 | Suzuki |
| 8,576,171 B2 | 11/2013 | Grant |
| 8,598,750 B2 | 12/2013 | Park |
| 8,598,972 B2 | 12/2013 | Cho et al. |
| 8,604,670 B2 | 12/2013 | Mahameed et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,633,916 B2 | 1/2014 | Bernstein et al. |
| 8,639,485 B2 | 1/2014 | Connacher et al. |
| 8,648,829 B2 | 2/2014 | Shahoian et al. |
| 8,653,785 B2 | 2/2014 | Collopy |
| 8,654,524 B2 | 2/2014 | Pance et al. |
| 8,681,130 B2 | 3/2014 | Adhikari |
| 8,686,952 B2 | 4/2014 | Burrough |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,754,759 B2 | 6/2014 | Fadell et al. |
| 8,760,037 B2 | 6/2014 | Eshed et al. |
| 8,773,247 B2 | 7/2014 | Ullrich |
| 8,780,074 B2 | 7/2014 | Castillo et al. |
| 8,797,153 B2 | 8/2014 | Vanhelle et al. |
| 8,803,670 B2 | 8/2014 | Steckel et al. |
| 8,834,390 B2 | 9/2014 | Couvillon |
| 8,836,502 B2 | 9/2014 | Culbert et al. |
| 8,836,643 B2 | 9/2014 | Romera Joliff et al. |
| 8,867,757 B1 | 10/2014 | Ooi |
| 8,872,448 B2 | 10/2014 | Boldyrev et al. |
| 8,878,401 B2 | 11/2014 | Lee |
| 8,907,661 B2 | 12/2014 | Maier et al. |
| 8,976,139 B2 | 3/2015 | Koga et al. |
| 8,977,376 B1 | 3/2015 | Lin et al. |
| 8,981,682 B2 | 3/2015 | Delson et al. |
| 8,987,951 B2 | 3/2015 | Park |
| 9,008,730 B2 | 4/2015 | Kim et al. |
| 9,024,738 B2 | 5/2015 | Van Schyndel et al. |
| 9,049,339 B2 | 6/2015 | Muench |
| 9,052,785 B2 | 6/2015 | Horie |
| 9,054,605 B2 | 6/2015 | Jung et al. |
| 9,058,077 B2 | 6/2015 | Lazaridis et al. |
| 9,086,727 B2 | 7/2015 | Tidemand et al. |
| 9,092,056 B2 | 7/2015 | Myers et al. |
| 9,104,285 B2 | 8/2015 | Colgate et al. |
| 9,122,330 B2 | 9/2015 | Bau et al. |
| 9,134,796 B2 | 9/2015 | Lemmons et al. |
| 9,172,669 B2 | 10/2015 | Swink et al. |
| 9,182,837 B2 | 11/2015 | Day |
| 9,218,727 B2 | 12/2015 | Rothkopf et al. |
| 9,245,704 B2 | 1/2016 | Maharjan et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,286,907 B2 | 3/2016 | Yang et al. |
| 9,304,587 B2 | 4/2016 | Wright et al. |
| 9,319,150 B2 | 4/2016 | Peeler et al. |
| 9,361,018 B2 | 6/2016 | Pasquero et al. |
| 9,396,629 B1 | 7/2016 | Weber et al. |

(56) References Cited

U.S. PATENT DOCUMENTS

| | | |
|---|---|---|
| 9,430,042 B2 | 8/2016 | Levin |
| 9,436,280 B2 | 9/2016 | Tartz et al. |
| 9,442,570 B2 | 9/2016 | Slonneger |
| 9,448,713 B2 | 9/2016 | Cruz-Hernandez et al. |
| 9,449,476 B2 | 9/2016 | Lynn et al. |
| 9,466,783 B2 | 10/2016 | Olien et al. |
| 9,489,049 B2 | 11/2016 | Li |
| 9,496,777 B2 | 11/2016 | Jung |
| 9,501,149 B2 | 11/2016 | Burnbaum et al. |
| 9,513,704 B2 | 12/2016 | Heubel et al. |
| 9,519,346 B2 | 12/2016 | Lacroix |
| 9,535,500 B2 | 1/2017 | Pasquero et al. |
| 9,539,164 B2 | 1/2017 | Sanders et al. |
| 9,557,830 B2 | 1/2017 | Grant |
| 9,557,857 B2 | 1/2017 | Schediwy |
| 9,563,274 B2 | 2/2017 | Senanayake |
| 9,564,029 B2 | 2/2017 | Morrell et al. |
| 9,594,429 B2 | 3/2017 | Bard et al. |
| 9,600,037 B2 | 3/2017 | Pance et al. |
| 9,600,071 B2 | 3/2017 | Rothkopf |
| 9,607,491 B1 | 3/2017 | Mortimer |
| 9,632,583 B2 | 4/2017 | Virtanen et al. |
| 9,639,158 B2 | 5/2017 | Levesque |
| 9,666,040 B2 | 5/2017 | Flaherty et al. |
| 9,707,593 B2 | 7/2017 | Berte |
| 9,710,061 B2 | 7/2017 | Pance et al. |
| 9,727,238 B2 | 8/2017 | Peh et al. |
| 9,733,704 B2 | 8/2017 | Cruz-Hernandez et al. |
| 9,829,981 B1 | 11/2017 | Ji |
| 9,830,782 B2 | 11/2017 | Morrell et al. |
| 9,857,872 B2 | 1/2018 | Terlizzi et al. |
| 9,870,053 B2 | 1/2018 | Modarres |
| 9,875,625 B2 | 1/2018 | Khoshkava et al. |
| 9,886,090 B2 | 2/2018 | Silvanto et al. |
| 9,902,186 B2 | 2/2018 | Whiteman et al. |
| 9,878,239 B2 | 3/2018 | Heubel et al. |
| 9,921,649 B2 | 3/2018 | Grant et al. |
| 9,927,887 B2 | 3/2018 | Bulea |
| 9,927,902 B2 | 3/2018 | Burr et al. |
| 9,928,950 B2 | 3/2018 | Lubinski et al. |
| 9,940,013 B2 | 4/2018 | Choi et al. |
| 9,971,407 B2 | 5/2018 | Holenarsipur et al. |
| 9,977,499 B2 | 5/2018 | Westerman et al. |
| 9,990,040 B2 | 6/2018 | Levesque |
| 9,996,199 B2 | 6/2018 | Park |
| 10,025,399 B2 | 7/2018 | Kim et al. |
| 10,037,660 B2 | 7/2018 | Khoshkava et al. |
| 10,061,385 B2 | 8/2018 | Churikov |
| 10,082,873 B2 | 9/2018 | Zhang |
| 10,110,986 B1 | 10/2018 | Min |
| 10,122,184 B2 | 11/2018 | Smadi |
| 10,152,131 B2 | 12/2018 | Grant |
| 10,235,849 B1 | 3/2019 | Levesque |
| 10,275,075 B2 | 4/2019 | Hwang et al. |
| 10,289,199 B2 | 5/2019 | Hoellwarth |
| 10,346,117 B2 | 7/2019 | Sylvan et al. |
| 10,372,214 B1 | 8/2019 | Gleeson et al. |
| 10,382,866 B2 | 8/2019 | Min |
| 10,390,139 B2 | 8/2019 | Biggs |
| 10,394,326 B2 | 8/2019 | Ono |
| 10,397,686 B2 | 8/2019 | Forstner |
| 10,430,077 B2 | 10/2019 | Lee |
| 10,437,359 B1 | 10/2019 | Wang et al. |
| 10,556,252 B2 | 2/2020 | Tsang et al. |
| 10,585,480 B1 | 3/2020 | Bushnell et al. |
| 10,649,529 B1 | 5/2020 | Nekimken et al. |
| 10,768,738 B1 | 9/2020 | Wang et al. |
| 2003/0117132 A1 | 6/2003 | Klinghult |
| 2005/0036603 A1 | 2/2005 | Hughes |
| 2005/0168109 A1* | 8/2005 | Takeuchi ............ H01L 41/0831 310/331 |
| 2005/0191604 A1 | 9/2005 | Allen |
| 2005/0230594 A1 | 10/2005 | Sato et al. |
| 2006/0017691 A1 | 1/2006 | Cruz-Hernandez et al. |
| 2006/0202170 A1* | 9/2006 | Koizumi ............... C04B 35/495 252/500 |
| 2006/0209037 A1 | 9/2006 | Wang et al. |
| 2006/0223547 A1 | 10/2006 | Chin et al. |
| 2006/0252463 A1 | 11/2006 | Liao |
| 2007/0106457 A1 | 5/2007 | Rosenberg |
| 2007/0152974 A1 | 7/2007 | Kim et al. |
| 2008/0062145 A1 | 3/2008 | Shahoian |
| 2008/0062624 A1 | 3/2008 | Regen |
| 2008/0084384 A1 | 4/2008 | Gregorio et al. |
| 2008/0111791 A1 | 5/2008 | Nikittin |
| 2009/0085879 A1 | 4/2009 | Dai et al. |
| 2009/0115734 A1 | 5/2009 | Fredriksson et al. |
| 2009/0160763 A1* | 6/2009 | Cauwels ................ G06F 3/016 345/156 |
| 2009/0166098 A1 | 7/2009 | Sunder |
| 2009/0167702 A1 | 7/2009 | Nurmi |
| 2009/0174672 A1 | 7/2009 | Schmidt |
| 2009/0207129 A1 | 8/2009 | Ullrich et al. |
| 2009/0225046 A1 | 9/2009 | Kim et al. |
| 2009/0243404 A1 | 10/2009 | Kim et al. |
| 2009/0267892 A1 | 10/2009 | Faubert |
| 2010/0116629 A1 | 5/2010 | Borissov et al. |
| 2010/0156818 A1* | 6/2010 | Burrough ............. G06F 3/041 345/173 |
| 2010/0225600 A1 | 9/2010 | Dai et al. |
| 2010/0231508 A1 | 9/2010 | Cruz-Hernandez et al. |
| 2010/0253651 A1* | 10/2010 | Day ..................... G06F 3/0443 345/175 |
| 2010/0313425 A1 | 12/2010 | Hawes |
| 2010/0328229 A1 | 12/2010 | Weber et al. |
| 2011/0115754 A1 | 5/2011 | Cruz-Hernandez |
| 2011/0128239 A1 | 6/2011 | Polyakov et al. |
| 2011/0132114 A1 | 6/2011 | Siotis |
| 2011/0169347 A1 | 7/2011 | Miyamoto et al. |
| 2011/0205038 A1 | 8/2011 | Drouin et al. |
| 2011/0210926 A1* | 9/2011 | Pasquero ............. G06F 1/1613 345/173 |
| 2011/0261021 A1 | 10/2011 | Modarres et al. |
| 2011/0298871 A1* | 12/2011 | Stephens ................ B41J 2/01 347/50 |
| 2012/0038469 A1* | 2/2012 | Dehmoubed ......... H04M 1/026 340/407.2 |
| 2012/0038471 A1 | 2/2012 | Kim et al. |
| 2012/0056825 A1 | 3/2012 | Ramsay et al. |
| 2012/0062491 A1 | 3/2012 | Coni et al. |
| 2012/0113008 A1 | 5/2012 | Makinen et al. |
| 2012/0127071 A1 | 5/2012 | Jitkoff et al. |
| 2012/0127088 A1 | 5/2012 | Pance et al. |
| 2012/0235942 A1 | 9/2012 | Shahoian |
| 2012/0249474 A1 | 10/2012 | Pratt et al. |
| 2012/0327006 A1 | 12/2012 | Israr et al. |
| 2013/0009905 A1* | 1/2013 | Castillo ................. G06F 3/044 345/174 |
| 2013/0016042 A1 | 1/2013 | Makinen et al. |
| 2013/0021296 A1* | 1/2013 | Min .................... G06F 3/0443 345/174 |
| 2013/0043670 A1 | 2/2013 | Holmes |
| 2013/0044049 A1 | 2/2013 | Biggs et al. |
| 2013/0076635 A1 | 3/2013 | Lin |
| 2013/0082970 A1 | 4/2013 | Frey et al. |
| 2013/0154996 A1* | 6/2013 | Trend .................... G06F 3/044 345/174 |
| 2013/0199915 A1* | 8/2013 | Guard ................... G06F 3/044 200/600 |
| 2013/0207793 A1 | 8/2013 | Weaber et al. |
| 2013/0215080 A1* | 8/2013 | Takeda ................. G06F 3/016 345/174 |
| 2014/0009441 A1* | 1/2014 | Bernstein ............... G06F 3/016 345/174 |
| 2014/0055407 A1* | 2/2014 | Lee ...................... G06F 3/0412 345/174 |
| 2014/0062948 A1 | 3/2014 | Lee et al. |
| 2014/0125470 A1 | 5/2014 | Rosenberg |
| 2014/0152618 A1* | 6/2014 | Ando .................... G06F 3/044 345/174 |
| 2014/0168175 A1 | 6/2014 | Mercea et al. |

(56) References Cited

U.S. PATENT DOCUMENTS

| | | | |
|---|---|---|---|
| 2014/0240289 A1* | 8/2014 | Myers | G06F 3/041 |
| | | | 345/174 |
| 2015/0035789 A1* | 2/2015 | Brunet | G06F 3/0446 |
| | | | 345/174 |
| 2015/0084909 A1* | 3/2015 | Worfolk | G06F 3/0414 |
| | | | 345/174 |
| 2015/0126070 A1 | 5/2015 | Candelore | |
| 2015/0130730 A1 | 5/2015 | Harley et al. | |
| 2015/0234493 A1 | 8/2015 | Parivar et al. | |
| 2015/0293592 A1 | 10/2015 | Cheong et al. | |
| 2015/0338919 A1 | 11/2015 | Weber et al. | |
| 2015/0349619 A1 | 12/2015 | Degner et al. | |
| 2016/0098107 A1 | 4/2016 | Morrell et al. | |
| 2016/0103545 A1* | 4/2016 | Filiz | G01L 1/005 |
| | | | 345/174 |
| 2016/0171767 A1 | 6/2016 | Anderson et al. | |
| 2016/0209979 A1 | 7/2016 | Endo et al. | |
| 2016/0216833 A1* | 7/2016 | Butler | G06F 3/0445 |
| 2016/0225568 A1* | 8/2016 | Chen | H03K 17/964 |
| 2016/0293829 A1 | 10/2016 | Maharjan et al. | |
| 2016/0306481 A1* | 10/2016 | Filiz | G01L 1/146 |
| 2016/0327911 A1 | 11/2016 | Eim et al. | |
| 2016/0328930 A1 | 11/2016 | Weber et al. | |
| 2016/0357331 A1* | 12/2016 | Kano | G06F 3/044 |
| 2016/0379776 A1 | 12/2016 | Oakley | |
| 2017/0003744 A1 | 1/2017 | Bard et al. | |
| 2017/0024010 A1 | 1/2017 | Weinraub | |
| 2017/0090655 A1* | 3/2017 | Zhang | G06F 3/0412 |
| 2017/0111734 A1 | 4/2017 | Macours | |
| 2017/0249024 A1 | 8/2017 | Jackson et al. | |
| 2017/0285799 A1* | 10/2017 | Iuchi | G06F 3/0412 |
| 2017/0285843 A1 | 10/2017 | Roberts-Hoffman et al. | |
| 2017/0336273 A1 | 11/2017 | Elangovan et al. | |
| 2017/0337025 A1 | 11/2017 | Finnan et al. | |
| 2017/0357325 A1 | 12/2017 | Yang et al. | |
| 2018/0005496 A1 | 1/2018 | Dogiamis | |
| 2018/0014096 A1 | 1/2018 | Miyoshi | |
| 2018/0029078 A1 | 2/2018 | Park et al. | |
| 2018/0046275 A1* | 2/2018 | Haran | G06F 3/0446 |
| 2018/0059839 A1* | 3/2018 | Kim | H01L 51/5284 |
| 2018/0081438 A1 | 3/2018 | Lehmann | |
| 2018/0095582 A1* | 4/2018 | Hwang | G06F 3/0416 |
| 2018/0181204 A1 | 6/2018 | Weinraub | |
| 2018/0194229 A1 | 7/2018 | Wachinger | |
| 2018/0321841 A1 | 11/2018 | Lapp | |
| 2018/0335883 A1* | 11/2018 | Choi | G06F 3/0445 |
| 2019/0064997 A1 | 2/2019 | Wang et al. | |
| 2019/0278232 A1 | 9/2019 | Ely et al. | |
| 2019/0310724 A1 | 10/2019 | Yazdandoost | |
| 2020/0004337 A1 | 1/2020 | Hendren et al. | |
| 2020/0073477 A1 | 3/2020 | Pandya et al. | |
| 2020/0233495 A1 | 7/2020 | Bushnell et al. | |

FOREIGN PATENT DOCUMENTS

| | | |
|---|---|---|
| CN | 101409164 | 4/2009 |
| CN | 101436099 | 5/2009 |
| CN | 101663104 | 3/2010 |
| CN | 101872257 | 10/2010 |
| CN | 201897778 | 7/2011 |
| CN | 201945951 | 8/2011 |
| CN | 102349039 | 2/2012 |
| CN | 203405773 | 1/2014 |
| CN | 203630729 | 6/2014 |
| CN | 104679233 | 6/2015 |
| CN | 105144052 | 12/2015 |
| CN | 106133650 | 11/2016 |
| CN | 206339935 | 7/2017 |
| CN | 207115337 | 3/2018 |
| DE | 214030 | 3/1983 |
| EP | 1686776 | 8/2006 |
| EP | 2743798 | 6/2014 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| KR | 101016208 | 2/2011 |
| KR | 20130137124 | 12/2013 |
| TW | 2010035805 | 10/2010 |
| TW | 201430623 | 8/2014 |
| WO | WO2002/073587 | 9/2002 |
| WO | WO2006/091494 | 8/2006 |
| WO | WO2007/049253 | 5/2007 |
| WO | WO2007/114631 | 10/2007 |
| WO | WO2009/038862 | 3/2009 |
| WO | WO2009/156145 | 12/2009 |
| WO | WO2010/129892 | 11/2010 |
| WO | WO2013/169303 | 11/2013 |
| WO | WO2014/066516 | 5/2014 |
| WO | WO2014/200766 | 12/2014 |
| WO | WO2016/091944 | 6/2016 |
| WO | WO2016/144563 | 9/2016 |

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

Stein et al., "A process chain for integrating piezoelectric transducers into aluminum die castings to generate smart lightweight structures," Results in Physics 7, pp. 2534-2539, 2017.

U.S. Appl. No. 16/377,197, filed Apr. 6, 2019, Pandya et al.

"Lofelt at Smart Haptics 2017," Auto-generated transcript from YouTube video clip, uploaded on Jun. 12, 2018 by user "Lofelt," Retrieved from Internet: <https://www.youtube.com/watch?v=3w7LTQkS430>, 3 pages.

"Tutorial: Haptic Feedback Using Music and Audio—Precision Microdrives," Retrieved from Internet Nov. 13, 2019: https://www.precisionmicrodrives.com/haptic-feedback/tutorial-haptic-feedback-using-music-and-audio/, 9 pages.

"Feel what you hear: haptic feedback as an accompaniment to mobile music playback," Retrieved from Internet Nov. 13, 2019: https://dl.acm.org/citation.cfm?id=2019336, 2 pages.

"Auto Haptic Widget for Android," Retrieved from Internet Nov. 13, 2019, https://apkpure.com/auto-haptic-widget/com.immersion.android.autohaptic, 3 pages.

D-BOX Home, Retrieved from Internet Nov. 12, 2019: https://web.archive.org/web/20180922193345/https://www.d-box.com/en, 4 pages.

U.S. Appl. No. 16/904,409, filed Jun. 17, 2020, Ostdiek et al.

\* cited by examiner

ELECTRONIC DEVICE HAVING A TOUCH SENSOR, FORCE SENSOR, AND HAPTIC ACTUATOR IN AN INTEGRATED MODULE

CROSS-REFERENCE TO RELATED APPLICATION

This application is a non-provisional patent application of and claims the benefit of U.S. Provisional Patent Application No. 62/555,019, filed Sep. 6, 2017 and titled "Electronic Device Having a Touch Sensor, Force Sensor, and Haptic Actuator in an Integrated Module," the disclosure of which is hereby incorporated herein by reference in its entirety.

FIELD

The described embodiments relate generally to input devices in electronic devices. More particularly, the present embodiments relate to an input/output module that receives touch and/or force inputs and provides localized deflection along an input surface of an electronic device.

BACKGROUND

Electronic devices are commonplace in today's society and typically include an input device used to control or provide commands to the electronic device. The input device may include a button, knob, key or other similar device that can be actuated by the user to provide the input. As electronic devices become more compact, it may be difficult to integrate traditional input devices without increasing the size or form factor of the electronic device. Additionally, many traditional input devices are not configurable, which may limit the adaptability of the electronic device.

Systems and techniques described herein are directed to an electronic device having an integrated module that includes a touch sensor, a force sensor, and a haptic actuator that may form an input device or input surface for an electronic device.

SUMMARY

Embodiments described herein relate to an electronic device that includes an input/output module for receiving touch and/or force inputs, and to provide localized haptic feedback. In some embodiments, the electronic device includes an input surface and the input/output module receives input on the input surface and provides haptic feedback to the same input surface.

In an example embodiment, an electronic device includes a cover defining an input surface and an input/output module below the cover. The input/output module includes a substrate. A drive input electrode is coupled to the substrate, and a sense input electrode is coupled to the substrate adjacent the drive input sensor. A piezoelectric element is coupled to the substrate and configured to cause a deflection of the cover in response to an actuation signal.

The electronic device also includes a processing circuit operably coupled to the drive input electrode and the sense input electrode. The processing circuit is configured to detect a touch on the input surface based on a change in capacitance between the drive input electrode and the sense input electrode. The processing circuit is further configured to detect an amount of force of the touch based on a change in resistance of the drive input electrode or the sense input electrode. The processing circuit is also configured to cause the actuation signal in response to at least one of the detected touch or the detected amount of force.

In some cases, in response to the actuation signal, the piezoelectric element contracts along a first direction. The contraction along the first direction causes the deflection in the cover along a second direction that is transverse to the first direction. The drive input electrode and the sense input electrode may be formed from a piezoresistive material deposited on the substrate in a spiral pattern. The touch may form a touch capacitance between a touching object and the sense and drive input electrodes, and the touch capacitance may cause the change in capacitance between the drive input electrode and the sense input electrode.

Another example embodiment may include a method of determining a location and an amount of force corresponding to a touch on an input surface of an electronic device. The method includes the operations of driving a first set of input electrodes, disposed on a surface of a substrate, with a drive signal and monitoring a second set of input electrodes, distinct from the first set of input sensors and disposed on the surface of the substrate, for a capacitive response to the drive signal and the touch.

The method further includes determining the location corresponding to the touch based on the capacitive response, monitoring the first set of input electrodes for a resistive response to the drive signal and the touch, and determining the amount of force corresponding to the touch based on the resistive response.

In some cases, the monitoring the second set of input sensors for the capacitive response and the monitoring the first set of input sensors for the resistive response occur during time periods which at least partially overlap. In other cases, the monitoring the second set of input sensors for the capacitive response occurs during a first period of time and the monitoring the first set of input sensors for the resistive response occurs during a second, non-overlapping period of time.

In still another example embodiment, an input device includes a cover defining an input surface external to the input device and a substrate coupled to the cover. The substrate includes a top surface facing the cover and a bottom surface. A drive input electrode is coupled to the top surface, and a sense input electrode is coupled to the top surface adjacent the drive input electrode. The input device also includes a piezoelectric element coupled to the bottom surface and configured to cause a deflection of the cover in response to an actuation signal. A processing circuit is operably coupled to the drive input electrode and the sense input electrode and configured to detect a location of a touch on the input surface and an amount of force corresponding to the touch.

In some cases, a conductive layer is deposited on the bottom surface and the piezoelectric element is coupled to a bottom of the conductive layer. The conductive layer may include an array of conductive pads, and the piezoelectric element may be electrically coupled to two conductive pads. The piezoelectric element may be coupled to the array of conductive pads by an anisotropic conductive film.

BRIEF DESCRIPTION OF THE DRAWINGS

The disclosure will be readily understood by the following detailed description in conjunction with the accompanying drawings, wherein like reference numerals designate like elements.

Figure 1:
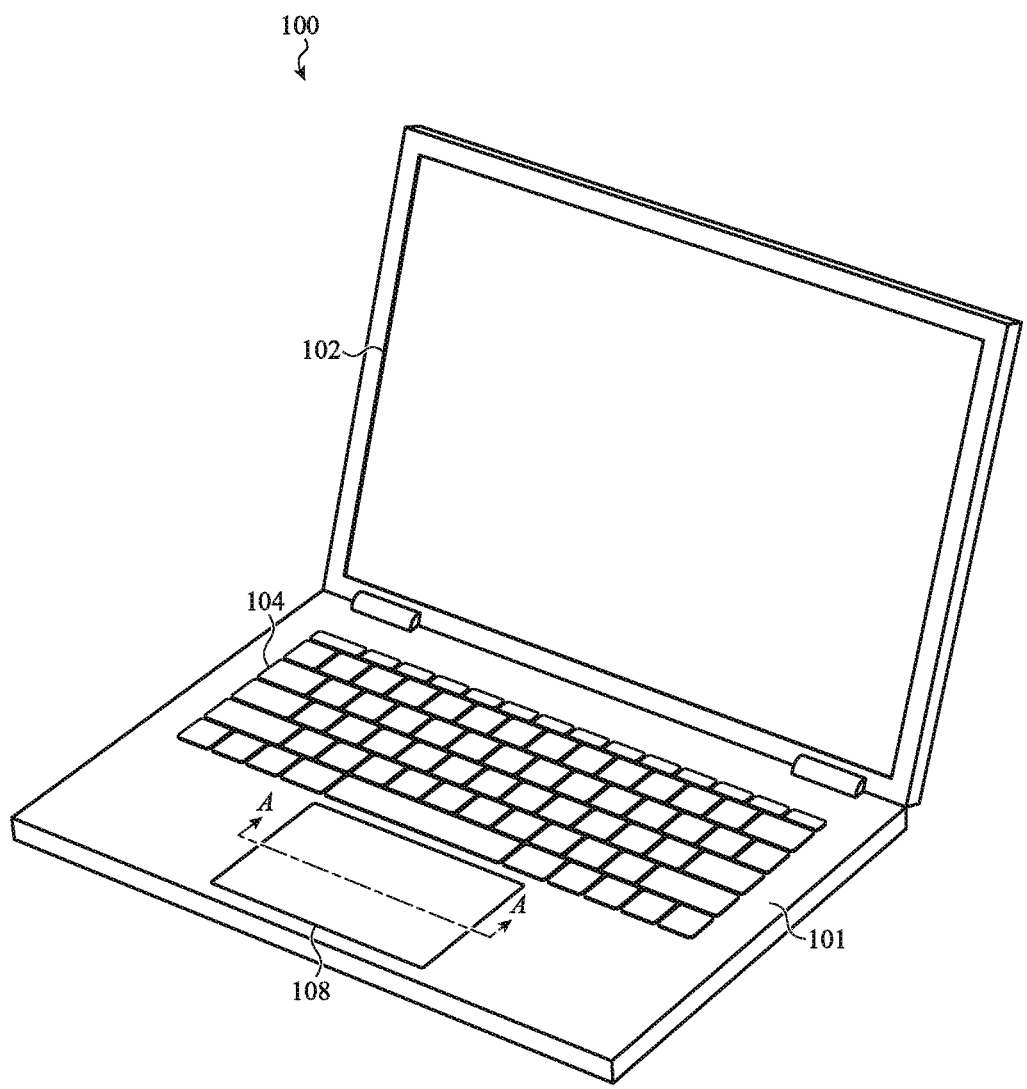
FIG. 1 depicts an electronic device with an input device having an integrated input/output module according to the present disclosure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to an electronic device with an input/output module that receives touch and/or force inputs and provides localized deflection at a surface. An electronic device may include an enclosure component defining an input surface for receiving user inputs and outputting feedback to the user. Example enclosure components include a cover (e.g., a cover sheet, a trackpad cover, and the like), a wall of an enclosure (e.g., a sidewall or other wall), and the like. Example input surfaces include a trackpad, a touch screen, a surface of a wall of a device enclosure, or another exterior surface of an enclosure of an electronic device. Example electronic devices include a personal computer, a notebook or laptop computer, a tablet, a smart phone, a watch, a case for an electronic device, a home automation device, and so on.

Sensors may be placed on, within, or below the enclosure component to receive various types of inputs. For example, a touch sensor may detect an object approaching or in contact with the input surface. By including an array of touch sensors, the electronic device may determine the location of the object, and in some cases of multiple objects, relative to the input surface.

As another example, a force sensor may detect a force applied to the enclosure component. Based on the output of the force sensor, the electronic device may approximate, measure, or otherwise determine an amount of the force applied to the cover. With an array of force sensors, the electronic device may determine the locations and amounts of multiple forces applied to the cover.

The electronic device may also provide haptic output to a user through the enclosure component. Haptic output is generated through the production of mechanical movement, vibrations, and/or force. In some embodiments, the haptic output can be created based on an input command (e.g., one or more touch and/or force inputs), a simulation, an application, or a system state. When the haptic output is applied to the enclosure component, a user can detect or feel the haptic output and perceive the haptic output as localized haptic feedback. The electronic device may include one or more haptic devices configured to provide haptic feedback.

In some embodiments, an integrated touch input, force input, and haptic feedback module (an "input/output module") is provided on, within, or below the enclosure component of an electronic device. In some embodiments, one or more components of the input/output module are integrally formed with the enclosure component. As used herein, "integrally formed with" may be used to refer to defining or forming a unitary structure. For example, one or more input electrodes and/or haptic devices may be integrally formed with an enclosure component, such as a ceramic enclosure of an electronic device. Integrally forming a haptic actuator with an enclosure component (e.g., on or within a wall of an enclosure) allows for localized haptic feedback (e.g., localized deflection of the wall) to be produced at select locations along an exterior surface of the enclosure. Similarly, integrally forming an input electrode within an enclosure component allows for localized touch input and force input detection at select locations along the exterior surface of the enclosure. In some embodiments, localized haptic feedback is produced in response to detecting touch and/or force input along the exterior surface of the enclosure.

In various embodiments, one or more components of the input/output module and/or other components of the electronic device may be integrally formed with an enclosure component by co-firing or co-sintering. As used herein, "co-firing" may be used to refer to any process by which one or more components or materials are fired in a kiln or otherwise heated to fuse or sinter the materials at the same time. For the purposes of the following discussion, "co-firing" may be used to refer to a process in which two materials, which are in a green, partially sintered, pre-sintered state are heated or sintered together for some period of time.

This input/output module may include one or more input electrodes, which are responsive to both touch and force inputs. That is, an array of input electrodes may be used to determine a location of a touch on the input surface and an amount (and location) of force applied to the cover. In some embodiments, an input electrode may be a strain gauge, having a series of parallel conductive traces, for example over a substrate, on a surface of the cover, or within the cover. The conductive traces may be formed in a variety of patterns, including a spiral pattern. As a strain gauge, the input electrode may exhibit a change in resistance in response to force or strain. In addition, the conductive material may exhibit a change in capacitance in response to the approach of a finger or other object.

Accordingly, an array of input electrodes may function as both touch and force sensors in a single layer, detecting a location of a touch on the input surface and an amount of force applied to the cover. In some embodiments, the input electrodes may be deposited on or otherwise attached to a top surface of a substrate, such as a glass or polyimide substrate. In some embodiments, the input electrodes may be deposited on or within, or otherwise attached to the cover.

The input/output module may also include one or more haptic actuators deposited on, within, or otherwise attached to a bottom surface of the substrate or the cover. A haptic actuator may provide localized haptic feedback to the cover. In an example embodiment, a haptic actuator may be a piezoelectric haptic actuator, having a piezoelectric element which contracts and/or expands in response to application of a voltage across the piezoelectric element.

When the haptic actuator is oriented such that an axis of elongation and/or contraction is parallel to an exterior surface of the cover (e.g., disposed within or on the cover or attached to the bottom surface of the substrate), an actuating signal may cause the piezoelectric element to contract along the axis of elongation and/or contraction (e.g., a first direction parallel to the bottom surface). Because the piezoelectric element is fixed with respect to the cover and/or the substrate, the piezoelectric element may bend and deflect along a second direction transverse to the axis of elongation and/or contraction, which may cause a deflection (e.g., a vertical deflection) of the substrate. The deflection of the substrate may be transferred to the cover. The deflection in the cover may be perceived as haptic feedback by a user through a finger or other body part in contact with the input surface.

In certain embodiments, the input/output module is disposed below an opaque cover (e.g., a cover including an opaque layer, such as an ink layer) defining an input surface, such as a trackpad of a laptop. The materials of the input/output module may be optically opaque materials. In other embodiments, the input/output module is disposed below a transparent cover defining an input surface, such as a cover of a cellular telephone or tablet device. In some examples, the input/output module may be placed between the cover and a display, and the input/output module may be formed from optically transparent materials. In other examples, the input/output module may be placed below the display and formed from opaque materials.

These and other embodiments are discussed below with reference to FIGS. 1-11. However, those skilled in the art will readily appreciate that the detailed description given herein with respect to these figures is for explanatory purposes only and should not be construed as limiting.

FIG. 1 depicts an electronic device with an input device having an integrated input/output module according to the present disclosure. In some embodiments, as depicted in FIG. 1, the electronic device 100 is a portable electronic device, specifically a laptop computer. Other embodiments may incorporate the input/output module into another type of portable electronic device, such as a mobile electronic device (see FIGS. 8A-8C). In other examples, an electronic device may include a smart phone, a wearable computing device, a digital music player, an automotive device, a kiosk, a stand-alone touch screen display, a mouse, a keyboard, and other types of electronic devices that are configured to receive touch and/or force inputs as well as provide haptic feedback to a user.

The electronic device 100 may include an enclosure 101 housing a keyboard 104 and a display 102. The electronic device 100 may also include an input device 108, such as a trackpad. The input device 108 may be positioned along a side of the keyboard 104. For example, as shown in FIG. 1, the keyboard 104 may be positioned between the input device 108 and a connection interface between the enclosure 101 and the display 102. The input device 108 may include a cover defining an input surface, and an input/output module may be incorporated below the cover. The input/output module may detect touch inputs and force inputs on the input surface, and additionally may provide haptic feedback to the cover. Examples of the input device 108 and the features of the input/output module are further depicted below with respect to FIGS. 2A-7B, 9, and 10.

The display 102 may function as both an input device and an output device. For example, the display 102 may output images, graphics, text, and the like to a user. The display 102 may also act as a touch input device that detects and measures a location of a touch input on the display 102, via touch-sensing circuitry. The electronic device 100 may also include one or more force sensors that detect and/or measure an amount of force exerted on the display 102.

The keyboard 104 of the electronic device 100 includes an array of keys or buttons (e.g., movable input components). Each of the keys may correspond to a particular input. The keyboard 104 may also include a frame or key web. The frame may define an aperture through which each key protrudes, such that each of the array of keys is at least partially positioned within the frame and at least partially without the frame. The frame also separates one key from an adjacent key and/or an enclosure of the electronic device 100.

In many cases, the electronic device 100 can also include a processor, memory, power supply and/or battery, network connections, sensors, input/output ports, acoustic components, haptic components, digital and/or analog circuits for performing and/or coordinating tasks of the electronic device 100, and so on. For simplicity of illustration, the electronic device 100 is depicted in FIG. 1 without many of these components, each of which may be included, partially and/or entirely, within the enclosure 101. Examples of such components are described below with respect to FIG. 11.

While this disclosure is generally described with respect to a trackpad, it should be understood that this is only one example embodiment. An integrated input/output module may be incorporated in other regions of a device to provide different functionality. For example, the input/output module may extend over a keyboard region of the electronic device 100 (e.g., in place of all or a portion of the keyboard 104) and may be used to define a virtual or soft keyboard. The input/output module may allow for an adaptable key arrangement and may include configurable or adaptable glyphs and markings to designate the location of an array of virtual or configurable key regions.

In another example, the input/output module forms an input surface over the display. This may enable a touch- and force-sensitive touch screen providing localized haptic output. The input/output module may be incorporated in a similar manner as described below with respect to FIGS. 8A-8C.

In still another example, the input/output module may form a portion of a key region, such as a function row above a physical keyboard. The input/output module may define a set of dynamically adjustable input regions. A display or other means may provide a visual representation (e.g., through adaptable glyphs and markings) to designate the location of virtual keys or input regions defined by the input/output module.

In still another example, the input/output module may be located on or within a portion of a device enclosure, such as a wall of a device enclosure, as discussed below with respect to FIGS. 9-11.

Figure 2A:
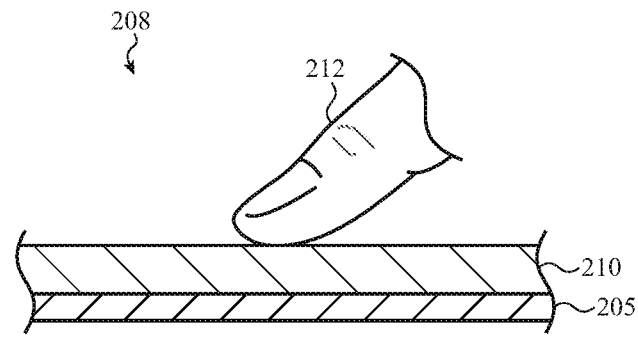
FIG. 2A depicts an example cross-sectional view of the electronic device depicted in FIG. 1, taken along section A-A, illustrating detection of a touch.
Figure 2B:
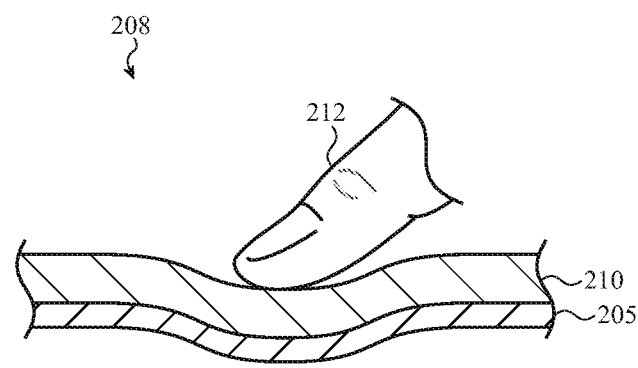
FIG. 2B depicts an example cross-sectional view of the electronic device depicted in FIG. 1, taken along section A-A, illustrating detection of a force.
Figure 2C:
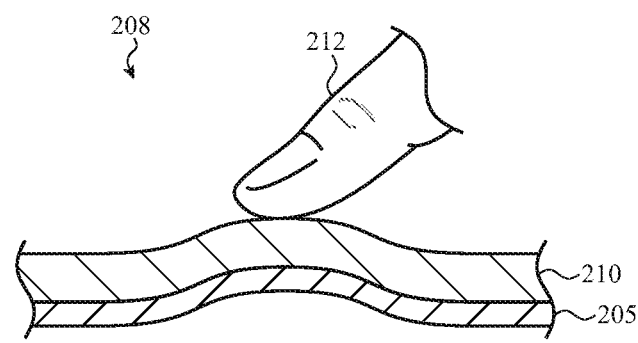
FIG. 2C depicts an example cross-sectional view of the electronic device depicted in FIG. 1, taken along section A-A, illustrating a haptic output.

As depicted in FIGS. 2A-2C, an input/output module may be attached to a cover of an electronic device. The input/output module detects touch and/or force inputs on the cover, and outputs localized haptic feedback to the cover. While in the following examples the term "cover" may refer to a cover for a trackpad, it should be understood that the term "cover" may also refer to a portion of an enclosure (such as the enclosure 101 depicted in FIG. 1).

FIG. 2A depicts an example cross-sectional view of the electronic device depicted in FIG. 1, taken along section A-A, illustrating detection of a touch location. As depicted in FIG. 2A, an input device 208 includes a cover 210 defining an input surface, and an input/output module 205 is attached or otherwise coupled to the cover 210. The input/output module 205 may be attached to the cover 210 through an appropriate means, such as depicted in FIGS. 5A-5F, 8B, and 8C.

Figure 3A:
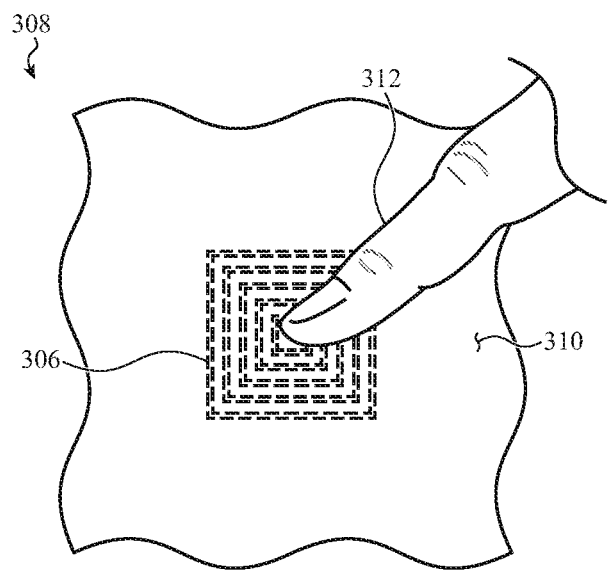
FIG. 3A depicts a top view of an input device illustrating an example touch and/or force-sensing input electrode.
Figure 3B:
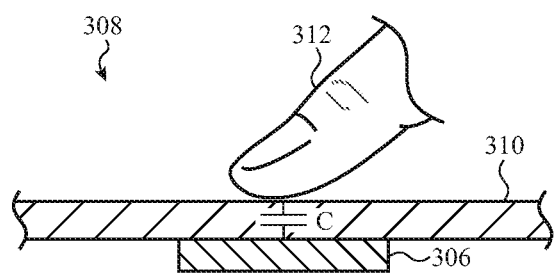
FIG. 3B depicts a cross-sectional view of the input device depicted in FIG. 3A, illustrating detection of a touch location by self-capacitance.
Figure 3C:
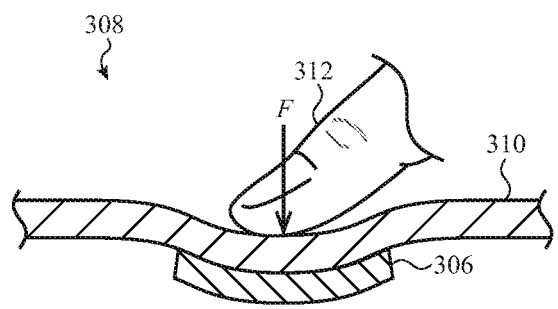
FIG. 3C depicts a cross-sectional view of the input device depicted in FIG. 3A, illustrating detection of an amount of force.
Figure 4A:
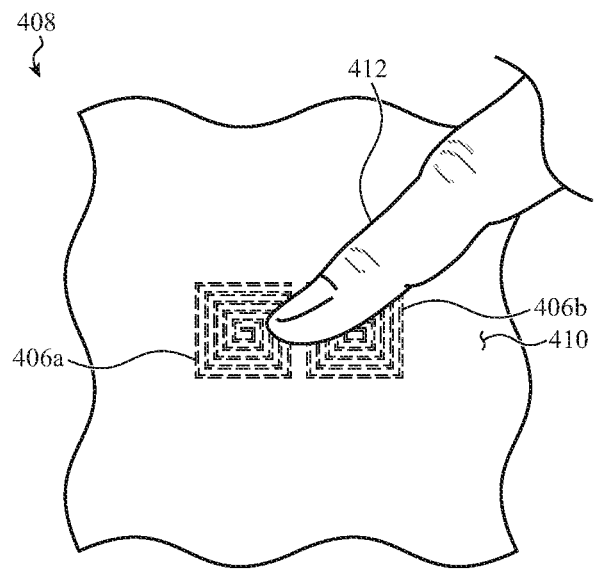
FIG. 4A depicts a top view of an input device illustrating an example pair of touch and/or force-sensing input electrodes.
Figure 4B:
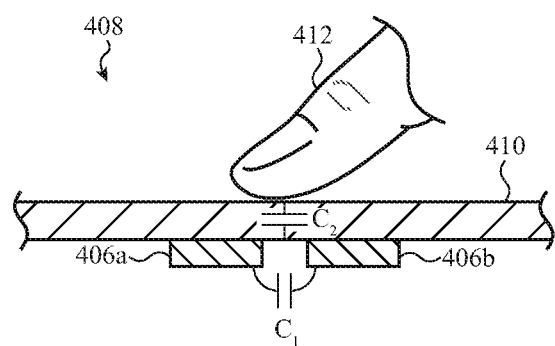
FIG. 4B depicts a cross-sectional view of the input device depicted in FIG. 4A, illustrating detection of a touch location by mutual capacitance.
Figure 4C:
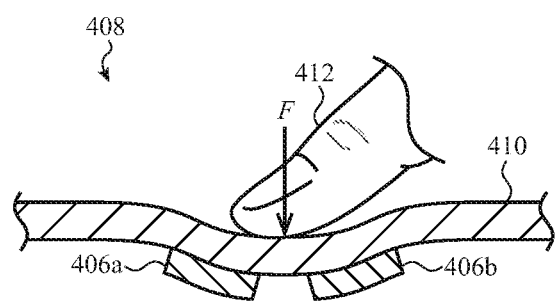
FIG. 4C depicts a cross-sectional view of the input device depicted in FIG. 4A, illustrating detection of an amount of force.

As an object, such as a finger 212 approaches and/or comes in contact with the cover 210, the input/output module 205 may detect the touch. In an example embodiment, the input/output module 205 may include an input electrode which detects the touch as a change in capacitance. The input electrode may operate through self-capacitance (as depicted in FIGS. 3A-3C) or through mutual capacitance (as depicted in FIGS. 4A-4C). The input electrode may be coupled to processing circuitry to determine the presence and location of the finger 212 on the input surface of the cover 210.

In addition, as depicted in FIG. 2B, the finger 212 or other object may exert force or pressure on the cover 210. This force may deflect the cover 210, which may in turn deflect the input/output module 205. As the input/output module 205 is deflected, an input electrode may have a non-binary response to the deflection, which response corresponds to and indicates the amount of force applied to the cover 210.

In an example embodiment, the input electrode may be a strain gauge which undergoes a change in resistance in response to deflection of the input/output module 205. The input electrode may be coupled to processing circuitry to estimate or otherwise determine the amount of force applied to the cover 210 based on the resistive response. In other embodiments, an input electrode may be otherwise responsive to strain. For example, the input electrode may be formed from a piezoresistive, piezoelectric, or similar material having an electrical property that changes in response to stress, strain, and/or deflection.

As depicted in FIG. 2C, the input/output module 205 may also provide localized haptic feedback to the cover 210. The input/output module 205 may include a haptic actuator which is coupled to processing circuitry and/or a signal generator. The processing circuitry and/or signal generator may actuate the haptic actuator by applying an electrical signal to the haptic actuator.

When an electrical signal is applied to the haptic actuator, the haptic actuator may cause the input/output module 205 to deflect upward. For example, the haptic actuator may include a piezoelectric element with a pair of electrodes coupled to opposing sides of the piezoelectric element (e.g., a top and bottom, which may be parallel to the cover 210). When an electrical signal is applied to the piezoelectric element, the piezoelectric element may contract along a first direction parallel to the electrodes. With the piezoelectric element coupled to a substrate, the contraction may cause the piezoelectric element to bend along a second direction transverse to the first direction. This bending of the piezoelectric element may cause the input/output module 205 to which the piezoelectric element is coupled to deflect upward toward the cover 210.

As the input/output module 205 deflects upward, it may cause one or more sections of the cover 210 to deflect or move to provide localized haptic feedback to the user. In particular, the cover 210 bends or deflects at a location that substantially corresponds to the location of the haptic actuator. This deflection of the cover 210 may be felt or otherwise perceived by a user through a finger 212 in contact with the cover 210.

The haptic actuator may be actuated in response to a variety of stimuli, such as a touch input, a force input, the operation of software executed by the processing circuitry, and so on. For example, the input/output module 205 may cause haptic feedback at the cover 210 in response to an amount of force exerted on the cover 210 exceeding a threshold (e.g., similar to a button press). In another example, software executed by the processing circuitry may cause the input/output module 205 to provide haptic feedback in response to events which occur during execution of the software.

It should be understood that FIGS. 2A-2C present cross-sectional views which may omit certain components for clarity. For example, as depicted in FIGS. 5A-5F, 8B, and 8C, the input/output module 205 may include multiple layers and components. One or more additional layers, such as an adhesive layer, may also be included between the cover 210 and the input/output module 205. The input device and/or the electronic device may also include additional components and structures, such as the components depicted in FIG. 11, support structures, and the like.

Turning to FIGS. 3A-3C, an input electrode of the input/output module may include a strain gauge which operates to detect touch through self-capacitance, and force may be detected through a resistive strain response of the input electrode. FIG. 3A is a top view of an input device, while FIGS. 3B and 3C are cross-sectional views of the input device.

FIG. 3A depicts a top view of an input device illustrating an example touch and/or force-sensing input electrode. The input device 308 may be any input device configured to detect touch and/or force inputs, such as the trackpad depicted in FIG. 1. The input device 308 includes a cover 310 defining an input surface, and an input electrode 306 positioned below the cover 310. A finger 312 or other object may approach or contact the input surface of the cover 310.

As depicted in FIG. 3A, in some embodiments the input electrode 306 may be a strain gauge formed from a conductive material patterned into a spiral pattern, which includes a set of parallel lines. In other embodiments, the input electrode 306 may be any type of sensor which responds to touch inputs and strain inputs, in which touch and strain may be distinguished. For example, the input electrode 306 may be formed from a piezoresistive, piezoelectric, or similar material having an electrical property (e.g., a resistance or resistivity) that changes in response to stress, strain, and/or deflection.

Turning to FIG. 3B, in some embodiments the input electrode 306 may operate to detect touch through self-capacitance. Thus, the conductive material of the input electrode 306 may be energized (e.g., driven) with an alternating current or direct current signal (e.g., from a signal generator). When a user's finger 312 approaches or comes in contact with the cover 310, a touch capacitance C may be formed between the finger 312 and the input electrode 306. The touch capacitance C formed between the finger 412 and the input electrode 306 (or change in capacitance) may be detected by processing circuitry coupled to the input electrode 306, which may indicate a touch input to the input surface of the cover 310.

As depicted in FIG. 3C, a force F applied to the cover 310 may be detected through the same input electrode 306. The input electrode 306 may be energized (e.g., driven) with an alternating current or direct current signal (e.g., from a signal generator). As a finger 312 or other object exerts a force F on the cover 310, the cover 310 may deflect and cause a strain on the input electrode 306. For example, the geometry of the conductive traces of the input electrode 306 may change in response to the cover 310 deflection (e.g., the traces may be stretched and/or compressed). This change in geometry may result in a change in resistance through the input electrode 306, which may be detected by processing circuitry coupled to the input electrode 306. The processing circuitry may further estimate or otherwise determine a non-binary amount of force applied to the cover 310 based on the change in resistance.

A "non-binary" amount of force or force input signal is one that may be registered as more than two possible values. Put another way, non-binary force input signals may have intermediate values, outputs, or states other than zero and a maximum (or off and on). Such non-binary signals may have a series of values, which may be discrete or continuous, each corresponding to a variety of input forces beyond binary options. Stated in another way, the force signal may vary in magnitude in accordance with a force that is applied to the cover.

In some embodiments, the input electrode 306 may be energized with an electrical signal (e.g., driven with a drive signal), and touch inputs may be detected or measured as a capacitive response to the signal while force inputs may be detected or measured as a resistive response to the signal. In other embodiments, touch and/or force sensing may be time multiplexed. The input electrode 306 may be driven with a first signal (e.g., a signal having a first waveform, which may include A/C and/or D/C components, and may have a given amplitude, shape, and/or frequency) for a first period of time, and a touch input may be measured as a capacitive response to the first signal. The input electrode 306 may be driven with a second signal (e.g., a signal having a second waveform, which may include A/C and/or D/C components, and may have a given amplitude, shape, and/or frequency)

for a second period of time, and a force input may be measured as a resistive response to the second signal. In still other embodiments, a same signal may be used to drive the input electrode 306, but the touch response may be measured during a first period of time and the force response may be measured during a second period of time.

Turning to FIGS. 4A-4C, two or more input electrodes of the input/output module may include strain gauges. The input electrodes may operate to detect touch through mutual capacitance between the input electrodes, and force may be detected through a resistive strain response of the input electrodes.

FIG. 4A depicts a top view of an input device illustrating an example pair of touch and/or force-sensing input electrodes. The input device 408 may be any input device configured to detect touch and/or force inputs, such as the trackpad depicted in FIG. 1. The input device 408 includes a cover 410 defining an input surface, and input electrodes 406a, 406b positioned below the cover 410. A finger 412 or other object may approach or contact the input surface of the cover 410.

Turning to FIG. 4B, in some embodiments the input electrode may operate to detect touch through mutual capacitance. Thus, a first input electrode, designated a drive input electrode 406a, may be driven with an alternating current or direct current signal (e.g., from a signal generator). A cross-capacitance $C_1$ may be formed between the drive input electrode 406a and a second input electrode adjacent the drive input electrode 406a, designated a sense input electrode 406b, in response to the drive signal. When a user's finger 412 approaches or comes in contact with the cover 410, a touch capacitance $C_2$ may be formed between the finger 412 and the drive input electrode 406a and/or the sense input electrode 406b. The touch capacitance $C_2$ may in turn alter the cross-capacitance $C_1$.

Processing circuitry may be coupled to the drive input electrode 406a and/or sense input electrode 406b to detect the change in the cross-capacitance $C_1$. In some embodiments, processing circuitry may monitor the sense input electrode 406b for a change in capacitance which may indicate a touch input to the input surface of the cover 410. In other embodiments, processing circuitry may monitor a capacitance across the drive input electrode 406a and the sense input electrode 406b, or by a similar technique.

As depicted in FIG. 4C, a force F applied to the cover 410 may be detected through one or both of the drive input electrode 406a and the sense input electrode 406b. For example, the drive input electrode 406a and the sense input electrode 406b may each be driven with an alternating current or direct current signal (e.g., from a signal generator). As a finger 412 or other object exerts a force F on the cover 410, the cover 410 may deflect and cause a strain on the input electrodes 406a, 406b. Processing circuitry may monitor the drive input electrode 406a and the sense input electrode 406b for a change in resistance, corresponding to a non-binary force applied to the cover 410. In other embodiments, the only one of the drive input electrode 406a and the sense input electrode 406b may be driven and monitored for a change in resistance.

Turning to FIGS. 5A-5F, example cross-sections of an input device according to the present disclosure are illustrated. Each example includes in input/output module which operates as described above with respect to FIGS. 1-4C.

Figure 5A:
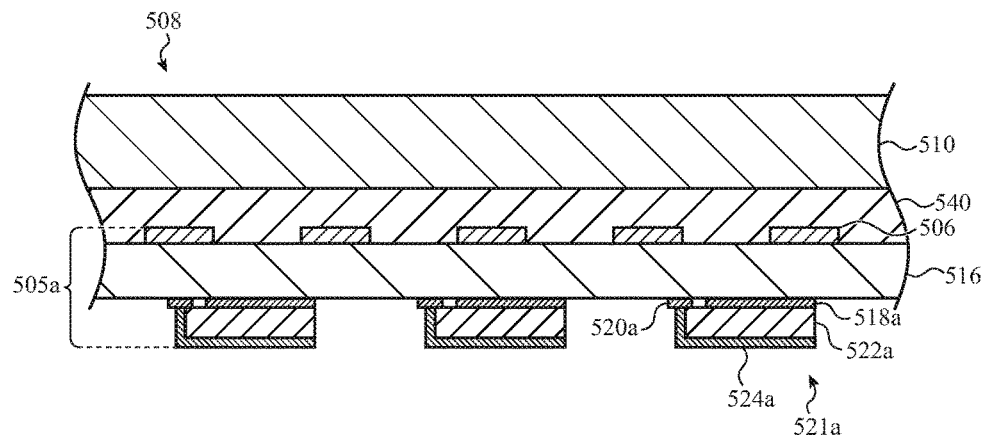
FIG. 5A depicts an example cross-sectional view of the electronic device depicted in FIG. 1, taken along section A-A, illustrating a first example input/output module.

FIG. 5A depicts an example cross-sectional view of the electronic device depicted in FIG. 1, taken along section A-A, illustrating a first example input/output module. An input device 508 includes a cover 510 and an input/output module 505a coupled to the cover 510.

Generally, the cover 510 is formed from a dielectric material, such as glass, plastic, acrylic, and other non-conductive materials. In some cases, the cover may be formed from an opaque material and/or include an opaque layer, such as an ink layer. In other cases, the cover 510 may be transparent or partially transparent. While in these examples the term "cover" may refer to a cover for a trackpad, it should be understood that the term "cover" may also refer to a portion of an enclosure (such as the enclosure 101 depicted in FIG. 1). For example, the cover 510 may enclose a virtual keyboard having dynamically adjustable input regions defined by the input/output module 505a, a sidewall of an electronic device, or the like.

The cover 510 may be coupled to the input/output module 505a by an adhesive layer 540. The adhesive layer 540 may include a pressure-sensitive adhesive, or another adhesive which couples the cover 510 to the input/output module 505a such that a deflection in the cover 510 is transferred through the adhesive layer 540 to the input/output module 505a, and a deflection of the input/output module 505a is transferred to the cover 510.

The input/output module 505a includes a substrate 516 on which input electrodes 506 and haptic actuators 521a are disposed. The substrate 516 may include materials such as, but not limited to: plastic, ceramic, glass, polyimide, polyethylene terephthalate, silicone, fiber composite, or any combination thereof. In some embodiments, the substrate 516 may provide structural rigidity for the input electrodes 506 and/or a stiffener to improve performance of the haptic actuators 521a.

One or more input electrodes 506 may be deposited on a top surface (e.g., the surface facing the cover 510) of the substrate 516. Each input electrode 506 may be formed from a conductive material which is also responsive to strain, formed with a set of conductive traces arranged in a doubled-back spiral shape, such as depicted below with respect to FIGS. 6B, 7A, and 7B. In other embodiments, the shape or geometry of an input electrode 506 may vary. For example, an input electrode 506 may be formed from a set of traces arranged in a forked or comb-shaped configuration, a linear serpentine shape, a radial serpentine shape, a spiral shape, and so on.

The conductive material of the input electrodes 506 may include materials such as, but not limited to: gold, copper, copper-nickel alloy, copper-nickel-iron alloy, copper-nickel-manganese-iron alloy, copper-nickel-manganese alloy, nickel-chrome alloy, chromium nitride, a composite nanowire structure, a composite carbon structure, graphene, nanotube, constantan, karma, silicon, polysilicon, gallium alloy, isoelastic alloy, and so on. The conductive material of the input electrodes 506 may be formed or deposited on a surface using a suitable disposition technique such as, but not limited to: vapor deposition, sputtering, printing, roll-to-roll processing, gravure, pick and place, adhesive, mask-and-etch, and so on.

Localized haptic feedback may be provided by means of the one or more haptic actuators 521a coupled to a bottom surface of the substrate 516, opposite the input electrodes 506. A haptic actuator 521a may include a piezoelectric element 522a, a top electrode 518a, and a bottom electrode 524a. The top electrode 518a (e.g., a conductive pad) and a conductive pad 520a may be formed from a conductive material deposited on the bottom surface of the substrate

516. The bottom electrode 524*a* may wrap around a portion of the piezoelectric element and couple to the conductive pad 520*a*.

The top electrode 518*a* and the conductive pad 520*a* may be disposed on a common layer, which may additionally include signal lines to transmit actuation signals to each haptic actuator 521*a* (e.g., such as depicted below with respect to FIG. 6C). Accordingly, a potential may be applied across the piezoelectric element 522*a*—a reference voltage may be provided to the bottom electrode 524*a* through the conductive pad 520*a*; and an actuation signal may be provided to the top electrode 518*a*. In some embodiments, the top electrode 518*a* may be coupled to a reference voltage and the bottom electrode 524*a* may be coupled to an actuation signal.

Each haptic actuator 521*a* can be selectively activated in the embodiment shown in FIG. 5A. In particular, the bottom electrode 524*a* can provide a reference voltage to a haptic actuator 521*a*, while the top electrode 518*a* can apply an electrical signal across each individual piezoelectric element 522*a* independently of the other piezoelectric elements 522*a*.

When a voltage is applied across the piezoelectric element 522*a*, the voltage may induce the piezoelectric element 522*a* to expand or contract in a direction or plane substantially parallel to the substrate 516. For example, the properties of the piezoelectric element 522*a* may cause the piezoelectric element 522*a* to expand or contract along a plane substantially parallel to the substrate when electrodes applying the voltage are placed on a top surface and bottom surface of the piezoelectric element 522*a* parallel to the substrate.

Because the top surface of the piezoelectric element 522*a* is attached to the substrate 516, as the piezoelectric element 522*a* contracts along the plane parallel to the substrate, the piezoelectric element 522*a* may bow and deflect in a direction orthogonal to the substrate 516, that is upward toward the cover 510, such as depicted above with respect to FIG. 2C. The haptic feedback may be localized to a portion of the cover 510 above the haptic actuator 521*a*.

The piezoelectric element 522*a* may be formed from an appropriate piezoelectric material, such as potassium-based ceramics (e.g., potassium-sodium niobate, potassium niobate), lead-based ceramics (e.g., PZT, lead titanate), quartz, bismuth ferrite, and other suitable piezoelectric materials. The top electrode 518*a*, the bottom electrode 524*a*, and the conductive pad 520*a* are typically formed from metal or a metal alloy such as silver, silver ink, copper, copper-nickel alloy, and so on. In other embodiments, other conductive materials can be used.

In some embodiments, the top electrode 518*a* and the conductive pad 520*a* are formed or deposited directly on the substrate 516 using a suitable disposition technique such as, but not limited to: vapor deposition, sputtering, printing, roll-to-roll processing, gravure, pick and place, adhesive, mask-and-etch, and so on. The piezoelectric element 522*a* may be similarly formed directly on the top electrode 518*a* and the conductive pad 520*a*, and the bottom electrode 524*a* may be formed directly on the piezoelectric element 522*a* and the conductive pad 520*a*.

While the haptic actuator 521*a* has been described with respect to a piezoelectric actuator, different types of haptic actuators 521*a* can be used in other embodiments. For example, in one embodiment one or more electromagnetic actuators can be disposed below the substrate 516 and used to produce localized deflection of the cover 510. Alternatively, one or more piston actuators may be disposed below the cover 510, and so on.

The relative position of the various layers described above may change depending on the embodiment. Some layers, such as the adhesive layer 540, may be omitted in other embodiments. Other layers, such as the cover 510 and the substrate 516, may not be uniform layers of single materials, but may include additional layers, coatings, and/or be formed from composite materials. The input device 508 and/or electronic device may include additional layers and components, such as processing circuitry, a signal generator, a battery, etc., which have been omitted from FIGS. 5A-5F for clarity.

Figure 5B:
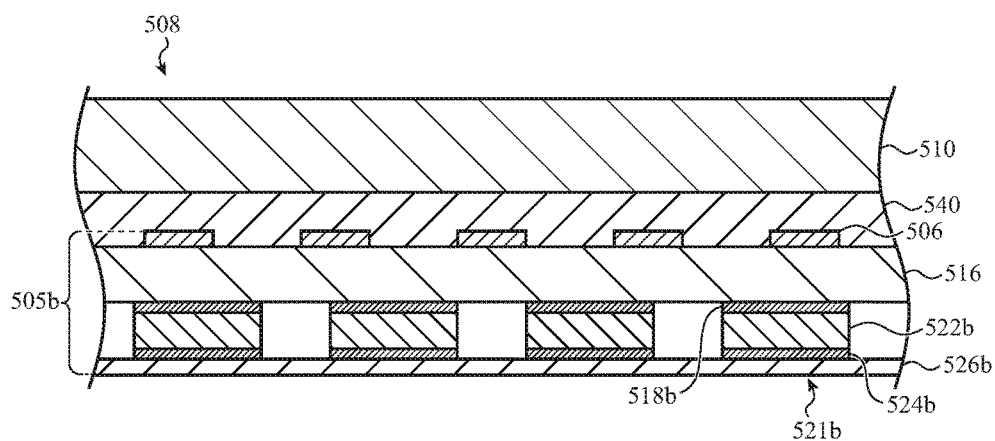
FIG. 5B depicts another example cross-sectional view of the electronic device depicted in FIG. 1, taken along section A-A, illustrating a second example input/output module.

FIG. 5B depicts another example cross-sectional view of the electronic device depicted in FIG. 1, taken along section A-A, illustrating a second example input/output module. As depicted in FIG. 5B, in some embodiments similar to FIG. 5A a haptic actuator 521*b* in the input/output module 505*b* may be selectively actuated through signals transmitted on two layers.

For example, the top electrode 518*b* may be deposited on the bottom surface of the substrate 516. Signal lines may also be deposited on the bottom surface of the substrate 516 to transmit actuation signals to each top electrode 518*b* of a haptic actuator 521*b*. A piezoelectric element 522*b* be formed directly on the top electrode 518*b*, and the bottom electrode 524*b* may be formed on the piezoelectric element 522*b*.

The input device 508 may also include a circuit layer 526*b* which includes signal lines to provide a common reference voltage to each bottom electrode 524*b* of a haptic actuator 521*b*. The circuit layer 526*b* may be a flexible printed circuit or a flexible printed circuit board. The circuit layer 526*b* can be made from any number of suitable materials, such as polyimide or polyethylene terephthalate, with conductive traces for signal lines formed from materials such as copper, silver, aluminum, and so on.

The circuit layer 526*b* may be coupled to each haptic actuator 521*b* in a manner that electrically couples a signal line or common reference voltage plate on the circuit layer 526*b* to each bottom electrode 524*b*. For example, the circuit layer 526*b* may be coupled to each haptic actuator 521*b* by an adhesive layer, such as an isotropic or anisotropic conductive film, by soldering, and other appropriate techniques.

Accordingly, a potential may be applied across the piezoelectric element 522*b*, with a common reference voltage provided to each bottom electrode 524*b* and a signal line provided to each top electrode 518*b*. A top electrode 518*b* may receive an actuation signal, and the voltage across the piezoelectric element 522*b* may cause the haptic actuator 521*b* to deflect, which in turn provides localized haptic feedback at the cover 510.

In some embodiments, the top electrodes 518*b* may form a common reference layer, and actuation signals may be transmitted to the bottom electrodes 524*b*. In such cases, the top electrodes 518*b* may be formed as an interconnected conductive layer (partially or entirely formed of conductive material), while the circuit layer 526*b* may include separate signal lines to provide actuation signals to each bottom electrode 524*b*.

Figure 5C:
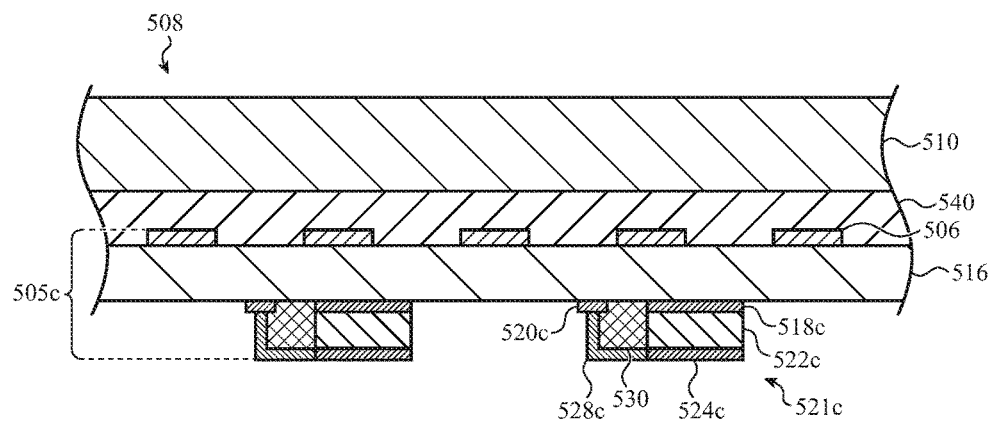
FIG. 5C depicts another example cross-sectional view of the electronic device depicted in FIG. 1, taken along section A-A, illustrating a third example input/output module.

FIG. 5C depicts another example cross-sectional view of the electronic device depicted in FIG. 1, taken along section A-A, illustrating a third example input/output module. As depicted in FIG. 5C, in some embodiments similar to FIG. 5A a haptic actuator 521*c* in the input/output module 505*c* may be formed with a dielectric 530 separating the conductive pad 520*c* from the top electrode 518*c*.

For example, a top electrode 518*c* and a conductive pad 520*c* may be disposed on a common layer, which may additionally include signal lines to transmit actuation signals to each haptic actuator 521c (e.g., such as depicted below with respect to FIG. 6C). A dielectric 530 may be deposited between the conductive pad 520c and the top electrode 518c to electrically isolate the conductive pad 520c from the top electrode 518c. The dielectric 530 further isolates the top electrode 518c and the bottom electrode 524c.

The dielectric 530 may be formed from silicon dioxide, hafnium oxide, tantalum oxide, nanopourous silica, hydrogensilsesquioxanes, polytetrafluoethylene, silicon oxyflouride, or another suitable dielectric material. The dielectric 530 may be formed or deposited using a suitable disposition technique such as, but not limited to: vapor deposition, sputtering, printing, roll-to-roll processing, gravure, pick and place, adhesive, mask-and-etch, and so on.

A connecting line 528c may be deposited over the dielectric 530, electrically coupling the conductive pad 520c to the bottom electrode 524c. The connecting line 528c may be formed from a similar material and using a similar technique as described above with respect to the conductive pad 520c and the top electrode 518c. A potential may be applied across the piezoelectric element 522c—a reference voltage may be provided to the bottom electrode 524c through the conductive pad 520c and the connecting line 528c; and an actuation signal may be provided to the top electrode 518c. In some embodiments, the top electrode 518c may be coupled to a reference voltage and the bottom electrode 524c may be coupled to an actuation signal.

Figure 5D:
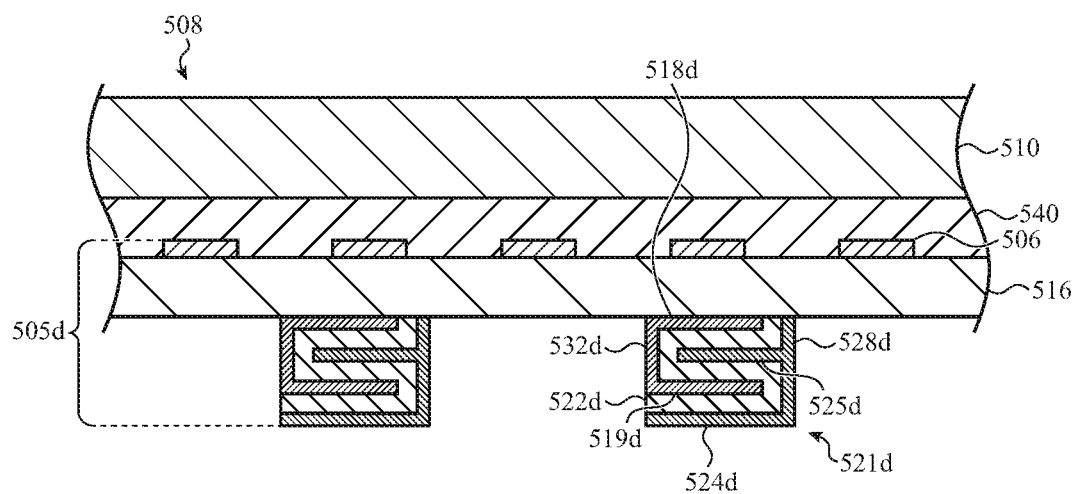
FIG. 5D depicts another example cross-sectional view of the electronic device depicted in FIG. 1, taken along section A-A, illustrating a fourth example input/output module.

FIG. 5D depicts another example cross-sectional view of the electronic device depicted in FIG. 1, taken along section A-A, illustrating a fourth example input/output module. As depicted in FIG. 5D, in some embodiments similar to FIG. 5A a haptic actuator 521d in the input/output module 505d may be formed by interleaving electrodes 525d, 519d in the piezoelectric element 522d.

By forming a haptic actuator 521d with interleaving electrodes 525d, 519d, the piezoelectric element 522d may operate effectively as two stacked piezoelectric elements 522d, which may improve the performance of the haptic actuator 521d when actuated. The top electrode 518d may be formed on the substrate 516, less than the entire width of the piezoelectric element 522d, and may be connected to signal lines disposed on the substrate 516.

The material of the piezoelectric element 522d may be deposited over the top electrode 518d, and an intermediate bottom electrode 525d may be formed on the piezoelectric material, spanning less than the entire width of the piezoelectric element 522d. Additional material of the piezoelectric element 522d may be deposited on the intermediate bottom electrode 525d, and an intermediate top electrode 519d may be deposited on the piezoelectric material, spanning less than the entire width of the piezoelectric element 522d.

Additional material of the piezoelectric element 522d may be deposited on the intermediate top electrode 519d. The bottom electrode 524d may be deposited over the piezoelectric element 522d. A bottom connecting line 528d may electrically connect the intermediate bottom electrode 525d and the bottom electrode 524d to signal lines disposed on the substrate 516. A top connecting line 532d may electrically connect the intermediate top electrode 519d to the top electrode 518d.

Accordingly, the haptic actuator 521d may be effectively two actuators, with the top electrode 518d and the intermediate bottom electrode 525d forming a first actuator. The intermediate top electrode 519d and the bottom electrode 524d form a second electrode. A potential may be applied across the portions of the piezoelectric element 522d between the electrodes. For example, a reference voltage may be provided to the intermediate bottom electrode 525d and the bottom electrode 524d through the bottom connecting line 528d; and an actuation signal may be provided to the top electrode 518d and the intermediate top electrode 519d through the top connecting line 532d. In some embodiments, the top electrode 518d and intermediate top electrode 519d may be coupled to a reference voltage and the intermediate bottom electrode 525d and the bottom electrode 524d may be coupled to an actuation signal.

Figure 5E:
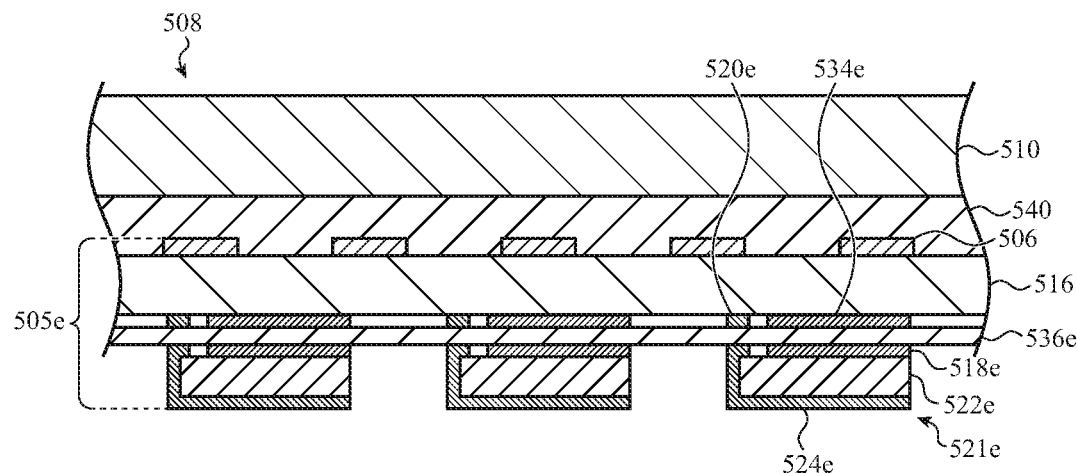
FIG. 5E depicts another example cross-sectional view of the electronic device depicted in FIG. 1, taken along section A-A, illustrating a fifth example input/output module.

FIG. 5E depicts another example cross-sectional view of the electronic device depicted in FIG. 1, taken along section A-A, illustrating a fifth example input/output module. As depicted in FIG. 5E, in some embodiments similar to FIG. 5A a haptic actuator 521e may be separately formed and coupled to the input/output module 505e.

For example, the haptic actuator 521e may be formed by a separate process rather than being deposited onto the substrate 516. A voltage may be applied across the piezoelectric element 522e via electrodes 518e, 524e formed on opposing surfaces of the piezoelectric element 522e. A top electrode 518e is formed on a top surface of the piezoelectric element 522e, while a bottom electrode 524e is formed on a bottom surface of the piezoelectric element 522e. In many embodiments, the bottom electrode 524e wraps around the piezoelectric element 522e such that a portion of the second electrode is disposed on the top surface of the piezoelectric element 522e. In this manner, a reference voltage and actuation signal may be provided at a same interface.

The electrodes 518e, 524e may be formed from a suitable conductive material, such as metal (e.g., silver, nickel, copper, aluminum, gold), polyethyleneioxythiophene, indium tin oxide, graphene, piezoresistive semiconductor materials, piezoresistive metal materials, and the like. The top electrode 518e may be formed from the same material as the bottom electrode 524e, while in other embodiments the electrodes 518e, 524e may be formed from different materials. The electrodes 518e, 524e may be formed or deposited using a suitable disposition technique such as, but not limited to: vapor deposition, sputtering, plating, printing, roll-to-roll processing, gravure, pick and place, adhesive, mask-and-etch, and so on. A mask or similar technique may be applied to form a patterned top surface of the piezoelectric element 522e and/or a wraparound bottom electrode 524e.

A first conductive pad 520e and a second conductive pad 534e may be formed from a conductive material deposited on the bottom surface of the substrate 516. The first conductive pad 520e and the second conductive pad 534e may be disposed on a common layer, which may additionally include signal lines to transmit actuation signals to each haptic actuator 521e (e.g., such as depicted below with respect to FIG. 6C).

The piezoelectric element 522e may be coupled to the first conductive pad 520e and the second conductive pad 534e by an adhesive layer 536e, which may be an anisotropic conductive film. The anisotropic conductive film of the adhesive layer 536e may facilitate conduction from the first conductive pad 520e to the bottom electrode 524e and from the second conductive pad 534e to the top electrode 518e. The anisotropic conductive film may further isolate these conduction paths to prevent an undesired short between the conductive pads 520e, 534e or electrodes 518e, 524e.

In other embodiments, the piezoelectric element 522e may be coupled and electrically connected to the first conductive pad 520e and the second conductive pad 534e by isolated segments of isotropic conductive film, an anisotropic or isotropic conductive paste, or another appropriate method.

Figure 5F:
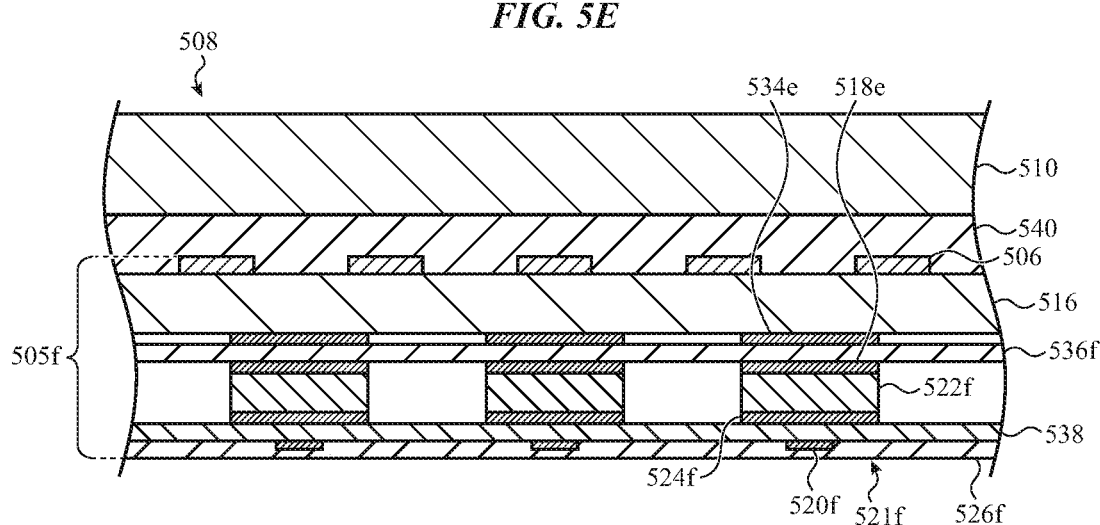
FIG. 5F depicts another example cross-sectional view of the electronic device depicted in FIG. 1, taken along section A-A, illustrating a sixth example input/output module.

FIG. 5F depicts another example cross-sectional view of the electronic device depicted in FIG. 1, taken along section A-A, illustrating a sixth example input/output module. As depicted in FIG. 5F, in some embodiments similar to FIG. 5A a haptic actuator 521f may be separately formed and coupled to the input/output module 505f and a circuit layer 526f.

For example, the haptic actuator 521f may be formed by a separate process rather than being deposited onto the substrate 516. A top electrode 518f is formed on a top surface of the piezoelectric element 522f, while a bottom electrode 524f is formed on a bottom surface of the piezoelectric element 522f in a manner similar to that described above with respect to FIG. 5E.

The input device 508 may also include a circuit layer 526f which includes signals lines to provide a common reference voltage to each bottom electrode 524f of a haptic actuator 521f. The circuit layer 526f may be a flexible printed circuit or a flexible printed circuit board, similar to that described above with respect to FIG. 5B. The circuit layer 526f may include a first conductive pad 520f for each haptic actuator 521f.

A second conductive pad 534f may be formed from a conductive material deposited on the bottom surface of the substrate 516. The second conductive pad 534f may be disposed on a layer which additionally includes signal lines to transmit actuation signals to each haptic actuator 521f.

The piezoelectric element 522f may be coupled to the second conductive pad 534f by a first adhesive layer 536f and the first conductive pad 520f by a second adhesive layer 538. The first adhesive layer 536f may be an anisotropic conductive film, which may facilitate conduction from the second conductive pad 534f to the top electrode 518f. The anisotropic conductive film may further isolate the conductive pad 534f and top electrode 518f of separate haptic actuators 521f to prevent an undesired short between haptic actuators 521f.

In other embodiments, the top electrode 518f may be coupled and electrically connected to the second conductive pad 534f by isolated segments of isotropic conductive film, an anisotropic or isotropic conductive paste, or another appropriate method.

The circuit layer 526f may couple a reference voltage to each bottom electrode 524f. Accordingly, the second adhesive layer 538 may be an isotropic conductive film, anisotropic conductive film, a conductive paste, or other conductive adhesion material.

Accordingly, a potential may be applied across the piezoelectric element 522f, with a common reference voltage provided to each bottom electrode 524f and a signal line provided to each top electrode 518f. A top electrode 518f may receive an actuation signal, and the voltage across the piezoelectric element 522f may cause the haptic actuator 521f to deflect, which in turn provides localized haptic feedback at the cover 510.

In some embodiments, the top electrodes 518f may form a common reference layer, and actuation signals may be transmitted to the bottom electrodes 524f. In such cases, the top electrodes 518f may be formed as an interconnected conductive layer (partially or entirely formed of conductive material), while the circuit layer 526f may include separate signal lines to provide actuation signals to each bottom electrode 524f. The second adhesive layer 538 may be an anisotropic conductive film or other adhesion material that isolates the first conductive pads 520f from each other.

Figure 6A:
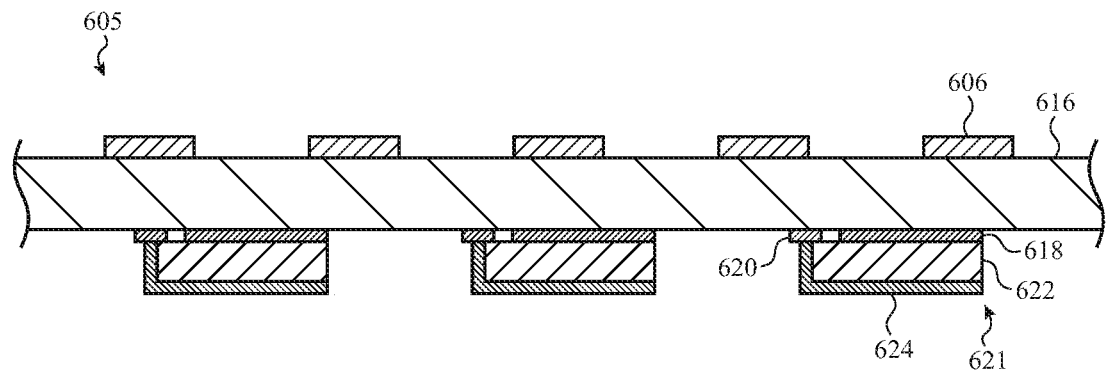
FIG. 6A depicts an example cross-sectional view of an input/output module illustrating the deposition of input electrodes on a top surface of a substrate and haptic actuators on a bottom surface of the substrate.

FIG. 6A depicts an example cross-sectional view of an input/output module illustrating the deposition of input electrodes on a top surface of a substrate and haptic actuators on a bottom surface of the substrate. The input/output module 605 may be similar to those depicted above with respect to FIGS. 5A-5F.

The input/output module 605 includes a substrate 616 on which input electrodes 606 and haptic actuators 621 are disposed. Generally, a set or array of input electrodes 606 are disposed on a top surface of the substrate 616, near a cover of an input device. A set or array of haptic actuators 621 is disposed on a bottom surface of the substrate 616. Each haptic actuator 621 may include a piezoelectric element 622 between a conductive pad 620 and a top electrode 618 above, and a bottom electrode 624 below.

Figure 6B:
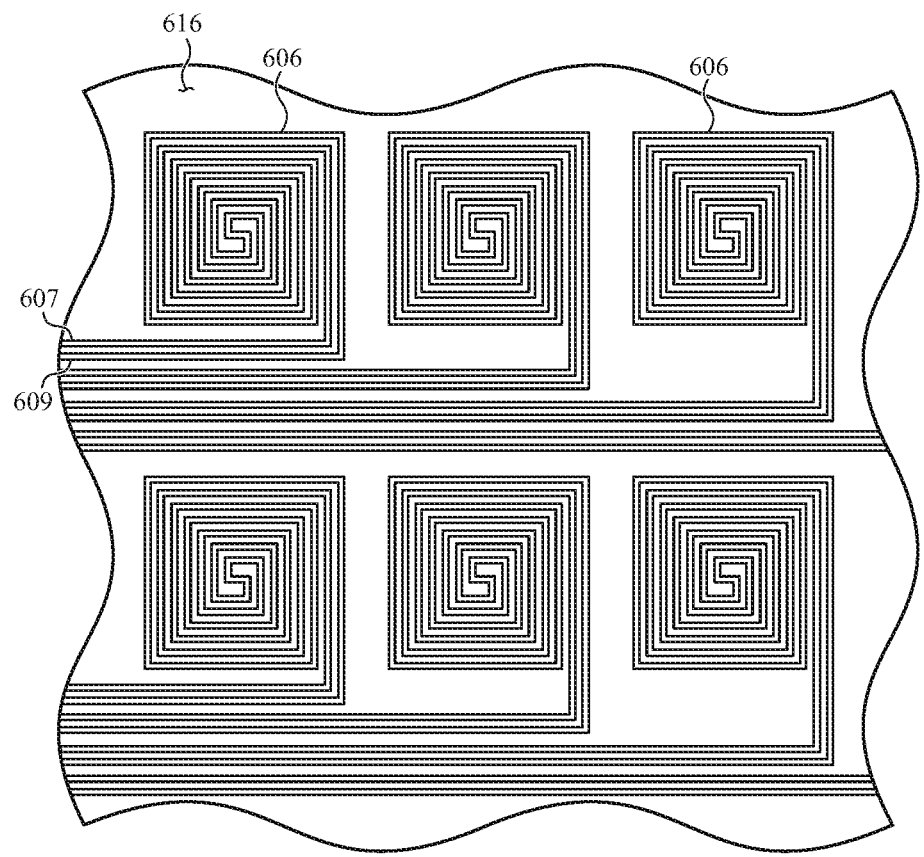
FIG. 6B depicts an example top view of input electrodes deposited on the top surface of the substrate.

FIG. 6B depicts an example top view of input electrodes deposited on the top surface of the substrate. As depicted, each input electrode 606 may be a touch- and strain-sensitive element, which may be a conductive trace deposited or otherwise formed on the substrate 616 as a strain gauge. Each input electrode 606 may be formed in a double-backed spiral shape. In other embodiments, the shape or geometry of an input electrode 606 may vary. For example, an input electrode 606 may be formed from a set of traces arranged in a forked or comb-shaped configuration, a linear serpentine shape, a radial serpentine shape, a spiral shape, and so on. In these and other embodiments, the input electrode 606 may include conductive traces set in one or more sets of parallel lines.

Each input electrode 606 includes or is electrically coupled to a first signal line 607 and a second signal line 609, which lead across the substrate 616 to connect to processing circuitry and/or a signal generator, such as described below with respect to FIG. 11. A signal generator may provide electrical signals to each input electrode 606 through the first signal line 607 or the second signal line 609. Processing circuitry may be coupled to one or both signal lines 607, 609 to detect a capacitive touch response and a resistive force response. That is, a presence and location of a touch may be detected through a change in capacitance of an input electrode 606, or across multiple input electrodes 606 (see FIGS. 3B and 4B, described above). A non-binary amount of force may be detected through a change in resistance through an input electrode 606 (see FIGS. 3C and 4C, described above).

The signal lines 607, 609 may be formed of a similar material and in a similar process as the input electrodes 606. In some embodiments, the input electrodes 606 and the signal lines 607, 609 are formed in a same processing step. In other embodiments, the input electrodes 606 are formed in one processing step and one or both signal lines 607, 609 are formed in a separate processing step. The input electrodes 606 and the signal lines 607, 609 may be arranged in any suitable pattern, such as a grid pattern, a circular pattern, or any other geometric pattern (including a non-regular pattern).

Figure 6C:
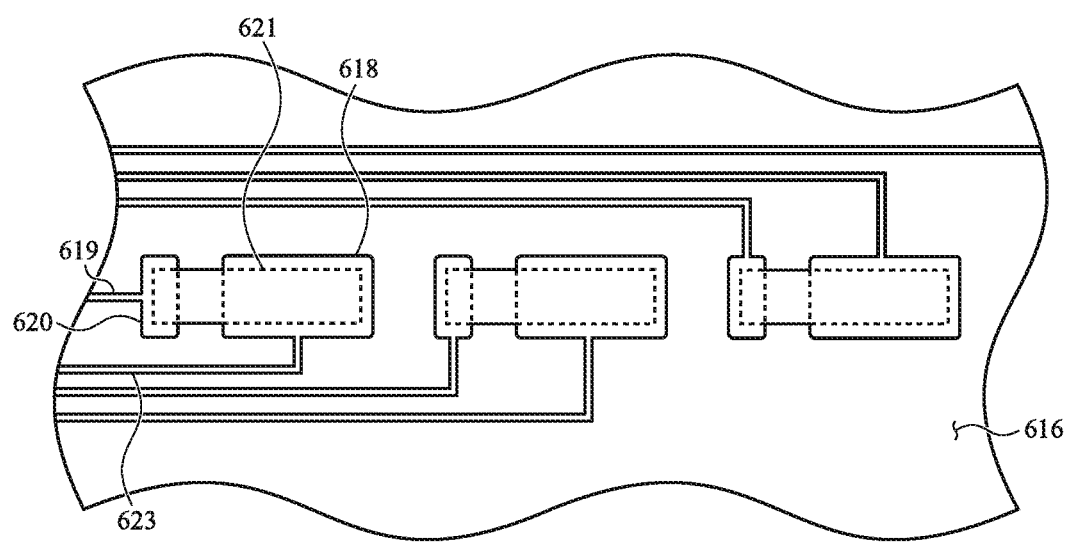
FIG. 6C depicts an example bottom view of a conducting layer for haptic actuators, deposited on the bottom surface of the substrate.

FIG. 6C depicts an example bottom view of a conducting layer for haptic actuators, deposited on the bottom surface of the substrate. FIG. 6C is depicted with other elements of each haptic actuator 621 shown as ghosted lines in order to clarify an example layout of a conducting layer.

As depicted, a conductive pad 620 and a top electrode 618 (e.g., another conductive pad) may be provided for each haptic actuator 621. Signal lines 619, 623 connect to each top electrode 618 and conductive pad 620 in order to electrically couple the haptic actuator 621 to a signal generator and/or processing circuitry and provide actuation signals. As shown, each conductive pad 620 may connect to a first signal line 619, which may provide a reference voltage to a bottom electrode of the haptic actuator 621. Each top electrode 618 may connect to a second signal line 623, which may provide an actuation signal to the haptic actuator 621. In other embodiments, the top electrodes 618 may be coupled to a reference voltage and the conductive pads 620 may receive an actuation signal.

The signal lines 619, 623 may be formed of a similar material and in a similar process as the conductive pads 620 and top electrodes 618, described above with respect to FIG. 5A. In some embodiments, the conductive pads 620, top electrodes 618, and signal lines 619, 623 are formed in a same processing step. In other embodiments, the conductive pads 620 and/or top electrodes 618 are formed in one processing step and one or more signal lines 619, 623 are formed in a separate processing step. The input electrodes 606 and the signal lines 607, 609 may be arranged in any suitable pattern, such as a grid pattern, a circular pattern, or any other geometric pattern (including a non-regular pattern).

In some embodiments, the input electrodes 606 and signal lines 607, 609 are formed on the top surface of the substrate 616 in one processing step, and the conductive pads 620, top electrodes 618, and signal lines 619, 623 are formed on the bottom surface of the substrate 616 in another processing step. In other embodiments, conducting material is formed on both sides of the substrate 616 in a same processing step.

Figure 7A:
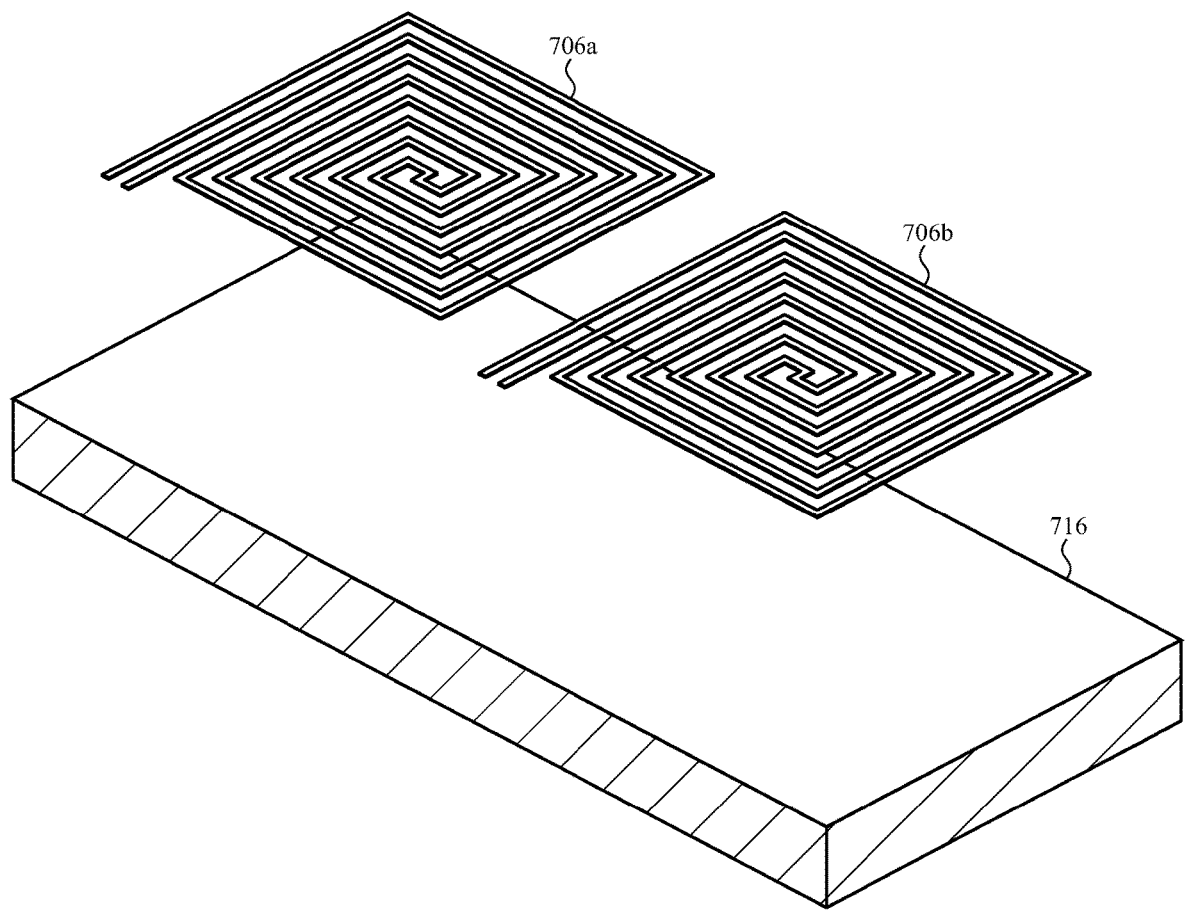
FIG. 7A depicts an example perspective view of a pair of input electrodes disposed adjacent one another over a substrate.
Figure 7B:
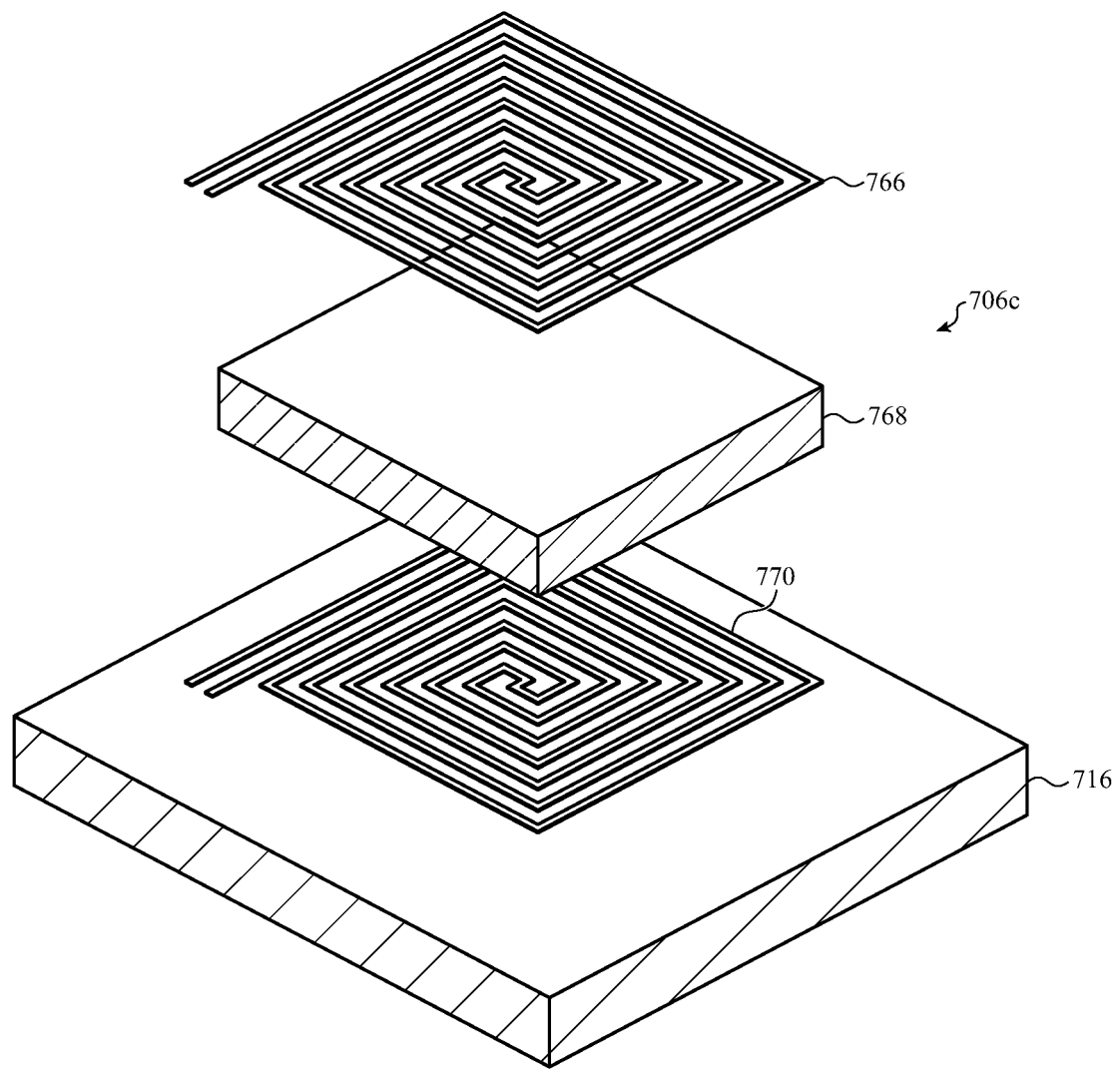
FIG. 7B depicts another example perspective view of a pair of input electrodes disposed above and below one another.

FIGS. 7A and 7B depict example input electrodes which may compensate for adverse environmental effects, such as changes in temperature. The performance of an input electrode 706a, 706b, 706c is dependent, in part, on the precision, accuracy, and resolution with which the strain experienced by the input electrode 706a, 706b, 706c may be estimated. As discussed above, processing circuitry may be configured to measure a change in the resistance of an input electrode 706a, 706b, 706c due to applied force.

However, an actual measurement of the resistance of an input electrode 706a, 706b, 706c may also be sensitive to variations in temperature, both across the device and localized over a portion of the device. Some embodiments of the input electrode 706a, 706b, 706c may be used to reduce or eliminate effects due to temperature or other environmental conditions.

For example, FIG. 7A depicts an example perspective view of a pair of input electrodes disposed adjacent one another over a substrate. In this configuration, a first input electrode 706a and a second input electrode 706b may be arranged in sufficient proximity that the two input electrodes 706a, 706b experience approximately the same environmental effects. The output of the first input electrode 706a and the second input electrode 706b may be compared by processing circuitry to mitigate or eliminate variations in force measurements as a result of changing environmental conditions, such as changes in temperature.

As an example, the first input electrode 706a may be more responsive to strain along a particular direction than the second input electrode 706b. The resistive response to of the first input electrode 706a may then be compared to the resistive response of the second input electrode 706b (e.g., by subtracting the response of the second input electrode 706b from the first input electrode 706a) to account for temperature variation.

FIG. 7B depicts another example perspective view of a pair of strain-sensitive element disposed above and below one another to form an input electrode. An input electrode 706a may include a first strain-sensitive element 770 disposed on the substrate 716. A second strain-sensitive element 766 is disposed above the first strain-sensitive element 770, with a film 768 or other dielectric material disposed between. In this configuration, the output of the first strain-sensitive element 770 may similarly be compared to the second strain-sensitive element 766 by processing circuitry to mitigate or eliminate variations in force measurements as a result of changes in temperature or other conditions.

As an example, the first strain-sensitive element 770 may be placed under compression while the second strain-sensitive element 766 may be placed under tension in response to a force on the cover. The distinct resistive responses of the first strain-sensitive element 770 and the second strain-sensitive element 766 may be compared to account for temperature variation.

Figure 8A:
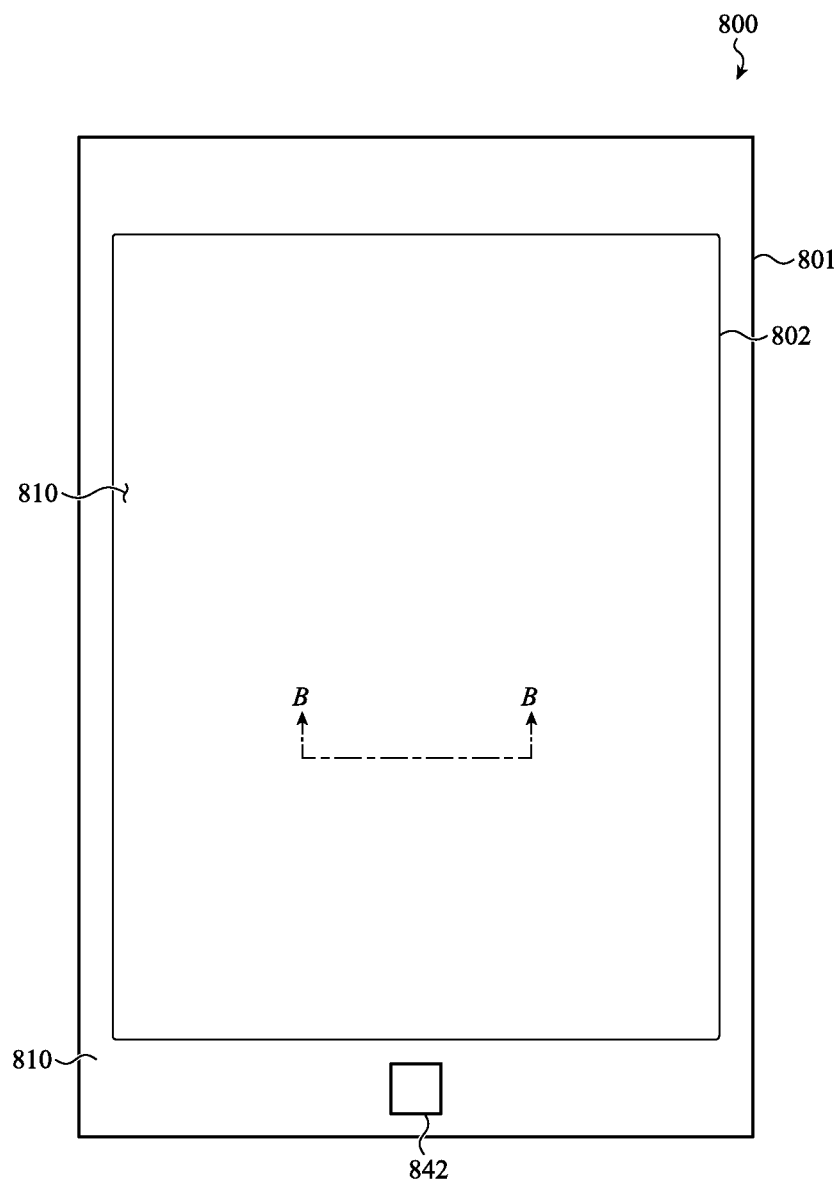
FIG. 8A depicts another electronic device with an input region having an integrated input/output module according to the present disclosure.

FIG. 8A depicts another electronic device with an input region having an integrated input/output module according to the present disclosure. In the illustrated embodiment, the electronic device 800 is implemented as a tablet computing device.

The electronic device 800 includes an enclosure 801 at least partially surrounding a display 802 and one or more input devices 842. The enclosure 801 can form an outer surface or partial outer surface for the internal components of the electronic device 800. The enclosure 801 can be formed of one or more components operably connected together, such as a front piece and a back piece. Alternatively, the enclosure 801 can be formed of a single piece operably connected to the display 802.

The display 802 can provide a visual output to the user. The display 802 can be implemented with any suitable technology, including, but not limited to, a liquid crystal display element, a light emitting diode element, an organic light-emitting display element, an organic electroluminescence element, an electrophoretic ink display, and the like.

In some embodiments, the input device 842 can take the form of a home button, which may be a mechanical button, a soft button (e.g., a button that does not physically move but still accepts inputs), an icon or image on a display, and so on. Further, in some embodiments, the input device 842 can be integrated as part of a cover 810 and/or the enclosure 801 of the electronic device 800. Although not shown in FIG. 1, the electronic device 800 can include other types of input and/or output devices, such as a microphone, a speaker, a camera, a biometric electrode, and one or more ports, such as a network communication port and/or a power cord port.

A cover 810 may be positioned over the front surface (or a portion of the front surface) of the electronic device 800. While the cover 810 is depicted in reference to a cover over a display of a tablet computer, an input/output module may be positioned below other transparent or partially transparent covers, such as an enclosure of a device forming a virtual keyboard. The input/output module and the display 802 may define user input regions, such as dynamically configurable keys, which may receive force and touch inputs and provide haptic outputs to the cover 810.

At least a portion of the cover 810 can function as an input surface that receives touch and/or force inputs. The cover 810 can be formed with any suitable material, such as glass, plastic, sapphire, or combinations thereof. In one embodiment, the cover 810 encloses the display 802 and the input device 842. Touch and/or force inputs can be received by the portion of the cover 810 that encloses the display 802 and by the portion of the cover 810 that encloses the input device 842.

In another embodiment, the cover 810 encloses the display 802 but not the input device 842. Touch and/or force inputs can be received by the portion of the cover 810 that encloses the display 802. In some embodiments, touch and/or force inputs can be received on other portions of the cover 810, or on the entire cover 810. The input device 842 may be disposed in an opening or aperture formed in the cover 810. In some embodiments, the aperture extends through the enclosure 801 and one or more components of the input device 842 are positioned in the enclosure.

An input/output module may be incorporated below all or a portion of the cover 810. The input/output module may detect touch inputs and force inputs on all or a portion of the cover 810, and additionally may provide haptic feedback to the cover 810. Examples of the electronic device 800 and the features of the input/output module are further depicted below with respect to FIGS. 8B, 8C, 9, and 10. Example components of the electronic device 800 are described below with respect to FIG. 11.

Figure 8B:
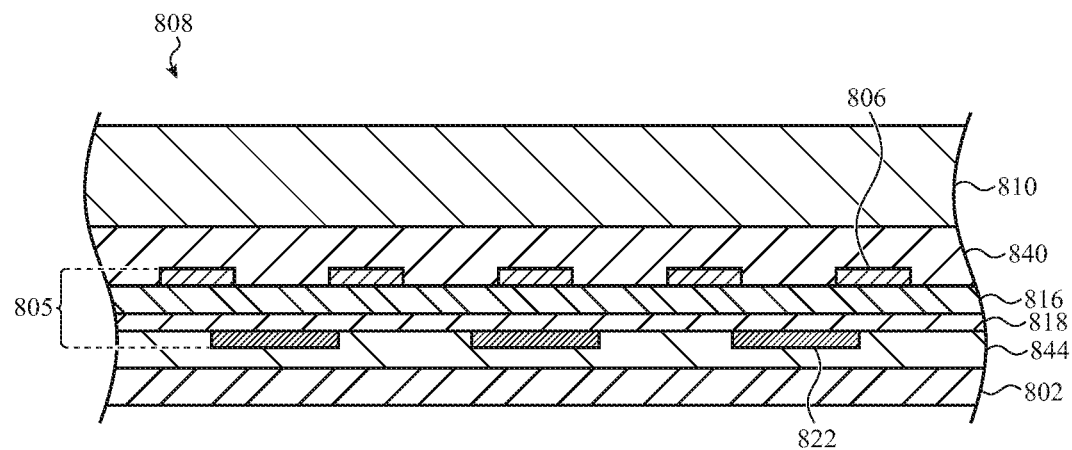
FIG. 8B depicts an example cross-sectional view of the electronic device depicted in FIG. 8A, taken along section B-B, illustrating a first example input/output module.

FIG. 8B depicts an example cross-sectional view of the electronic device depicted in FIG. 8A, taken along section B-B, illustrating a first example input/output module. An input device 808 includes a cover 810 defining an input surface, a display 802 below the cover 810, and an input/output module 805 between the cover 810 and the display 802.

The cover 810 is typically formed from a transparent dielectric material, such as glass, sapphire, plastic, acrylic, and other transparent, non-conductive materials. The cover 810 may be coupled to the input/output module 805 by an adhesive layer 840. The adhesive layer 840 may include an optically clear adhesive, or another transparent adhesive which couples the cover 810 to the input/output module 805 such that a deflection in the cover 810 is transferred through the adhesive layer 840 to the input/output module 805, and a deflection of the input/output module 805 is transferred to the cover 810.

The input/output module 805 includes a substrate 816 on which input electrodes 806 and haptic actuators are disposed, in a manner similar to the input/output modules 505a-505f described above with respect to FIGS. 5A-5F. The materials of the substrate 816, the input electrodes 806, and the piezoelectric elements 822 may be optically transparent. The piezoelectric elements 822 of the haptic actuators may be coupled to the substrate 816 through a conductive layer 818, which may provide actuation signals to the piezoelectric elements 822.

Conductive materials of the input/output module 805, such as the input electrodes 806 and the conductive layer 818 may be formed from optically transparent materials, such as, but not limited to: indium-tin oxide, carbon nanotubes, metal nanowires, or any combination thereof. The piezoelectric element 822 may be formed from a transparent piezoelectric material, such as lithium niobate, quartz, and other suitable piezoelectric materials.

The display 802 may include a display element, and may include additional layers such as one or more polarizers, one or more conductive layers, and one or more adhesive layers. In some embodiments, a backlight assembly (not shown) is positioned below the display 802. The display 802, along with the backlight assembly, is used to output images on the display. In other embodiments, the backlight assembly may be omitted.

Figure 8C:
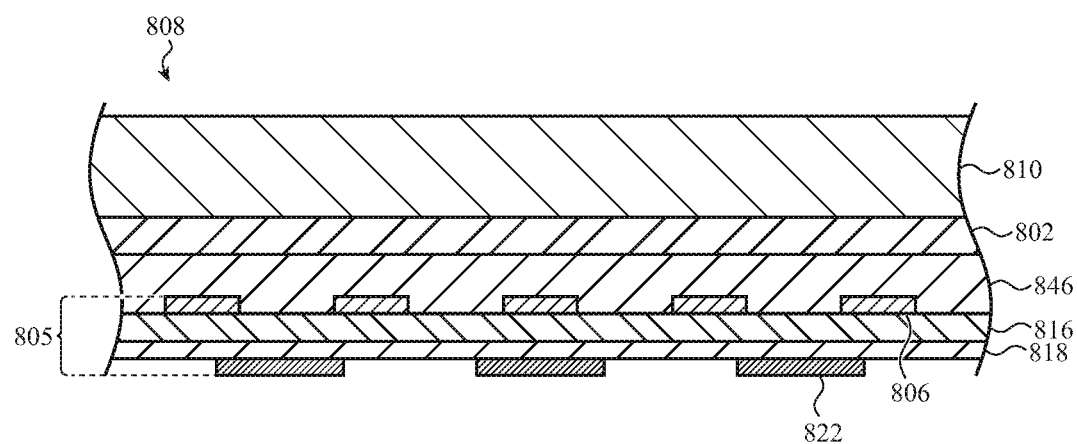
FIG. 8C depicts another example cross-sectional view of the electronic device depicted in FIG. 8A, taken along section B-B, illustrating a second example input/output module.

FIG. 8C depicts another example cross-sectional view of the electronic device depicted in FIG. 8A, taken along section B-B, illustrating a second example input/output module. In some embodiments, the display 802 may be positioned adjacent the cover 810, and the input/output module 805 may be placed below the display 802.

The input/output module 805 may be coupled to the display 802 by an adhesive layer 846. The input/output module 805 may include a substrate 816 on which input electrodes 806, and haptic actuators are disposed. The haptic actuators may include a conductive layer 818 and a piezoelectric element 822. Each of these components may be similar to those described above with respect to FIGS. 5A-5F and 8C, and may be optically transparent or opaque.

In various embodiments, the input/output modules shown and described with respect to FIGS. 5A-8C include haptic actuators and input electrodes disposed beneath a cover as part of a separate layer from the cover, such as a substrate. These are example arrangements of the haptic actuators with respect to the cover, and other arrangements are possible. For example, in some embodiments, one or more haptic actuators or input electrodes may be integrally formed with (e.g., on or within) a wall of an enclosure of a portable electronic device. FIGS. 9-10D depict example embodiments in which haptic actuators and input electrodes are integrally formed with (e.g., on or within) a wall of an enclosure.

Figure 9:
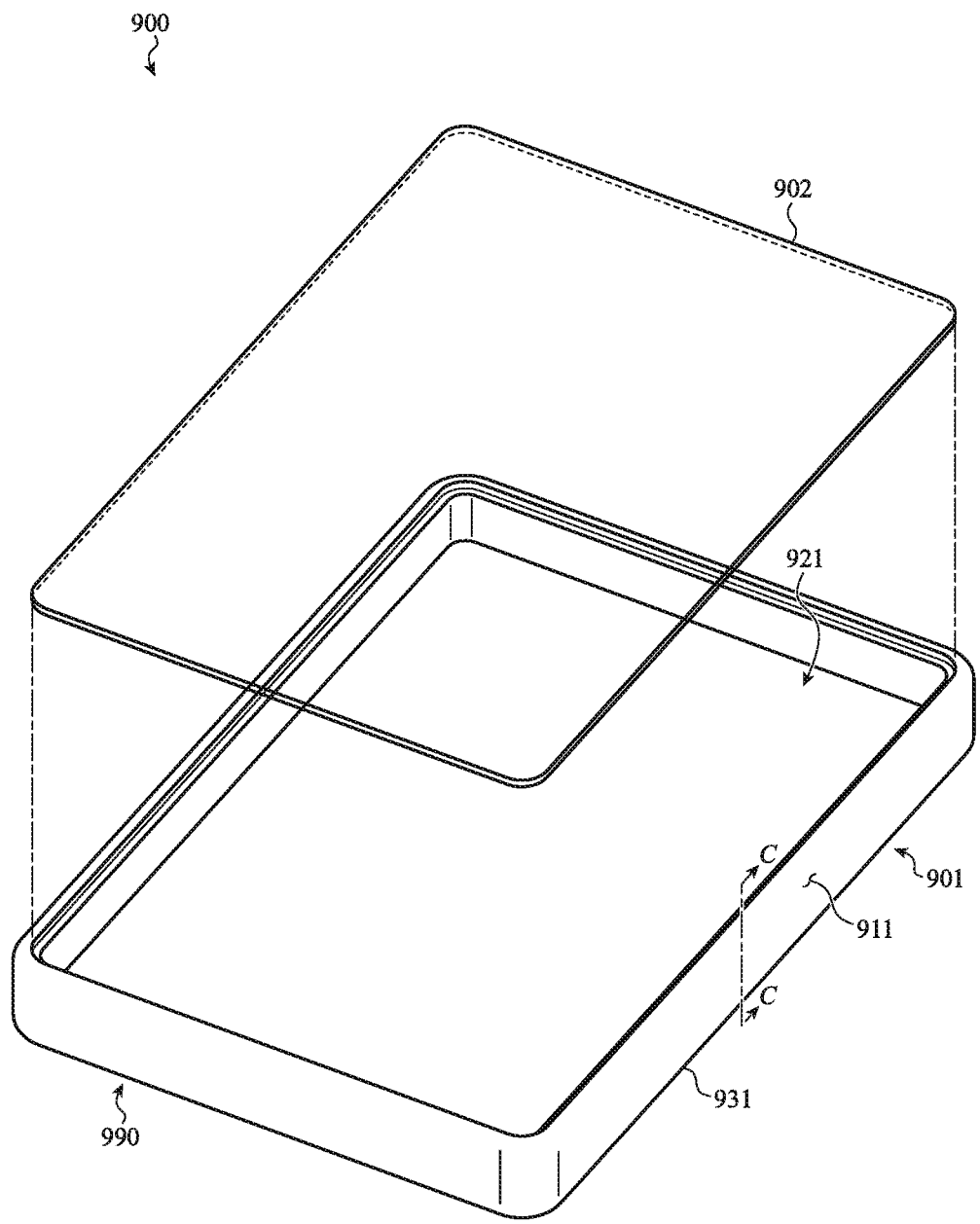
FIG. 9 depicts an enclosure for an electronic device having an input/output module disposed at least partially within a portion of the enclosure.

FIG. 9 depicts an enclosure 900 for an electronic device 990 (e.g., a portable electronic device) having one or more components of an input/output module integrally formed with a wall of the enclosure. In some embodiments, the electronic device 990 is an electronic watch or smartwatch. In various embodiments, the enclosure 900 may include an enclosure component 901 and a cover 902. The enclosure component 901 and the cover 902 may be attached or otherwise coupled and may cooperate to form the enclosure 900 and define one or more exterior surfaces of the electronic device 990. In various embodiments, one or more input/output modules may be at least partially integrally formed with a wall 931 of the enclosure 900. As used herein, "integrally formed with" may be used to refer to defining or forming a unitary structure. For example, one or more haptic actuators, input electrodes, and/or other components of an input/output module may be integrally formed on or within the wall 931 to form a unitary structure by co-firing or co-sintering the one or more haptic actuators, input electrodes, and/or other components with at least a portion of the enclosure 900.

The wall 931 (e.g., a sidewall of the electronic device 990) defines at least a portion of an exterior surface of the enclosure 900 that is configured to receive a contact from a user. Integrally forming a haptic actuator within a wall of the enclosure allows for localized haptic feedback (e.g., localized deflection of the wall 931) to be produced at select locations along an exterior surface of the enclosure, for example in response to a touch input detected along the exterior surface. Similarly, integrally forming an input electrode within a wall of the enclosure allows for localized touch input and force input detection at select locations along the exterior surface of the enclosure.

In various embodiments, the enclosure 900, including the enclosure component 901, may be formed from a variety of materials including polymers (e.g., polycarbonate, acrylic), glass, ceramics, composites, metal or metal alloys, (e.g., stainless steel, aluminum), precious metals (e.g., gold, silver), or other suitable materials, or a combination of these materials. In some embodiments, the enclosure component 901 is at least partially formed from a ceramic material such as aluminum oxide (alumina) or other similar type of material. In various embodiments, the enclosure component 901 may be co-fired with one or more components of the input/output module and/or other components of the electronic device 990. As used herein, "co-firing" may be used to refer to any process by which one or more components or materials are fired in a kiln or otherwise heated to fuse or sinter the materials at the same time. For the purposes of the following discussion, "co-firing" may be used to refer to a process in which two materials, which are in a green, partially sintered, pre-sintered state are heated or sintered together for some period of time. In various embodiments, a co-firing process may include low temperature (LTCC) applications (e.g., sintering temperatures below 1000 degrees Celsius) and/or high temperature (HTCC) applications (e.g., high temperatures between 1000 and 1800 degrees Celsius). In various embodiments, co-firing components of the electronic device 990 may improve the electronic device by reducing device dimensions (e.g., thickness of a wall or other component), reducing or eliminating the need for adhesives to join components together, simplifying manufacturing, and the like.

In some embodiments, one or more components of the input/output module are at least partially formed of a ceramic material. For example, the input/output module may include one or more piezoelectric ceramic actuators, ceramic buffers, or the like, as discussed below. More specifically, as described in more detail below, the input/output module may include a piezoelectric element that is configured to produce a localized deflection along the exterior surface of the enclosure component 901. If the enclosure component 901 and the piezoelectric element are both formed from ceramic materials, the two components may be integrally formed using a co-firing or co-sintering process.

In some embodiments, the cover 902 may include a sheet or cover sheet that is positioned over a display of the electronic device 990. The display may include one or more input devices or touch sensors and be configured as a touch-sensitive or touchscreen display. The touch sensors may include input electrodes or electrodes in accordance with embodiments described herein. Specifically, the touch sensors may include an array of input electrodes that are configured to detect a location of a touch input along the cover 902. In some instances, an array of electrodes that are configured to detect a force of a touch input are positioned along or below the cover 902.

The cover 902 may be formed from an optically transmissive material to allow images or light to be visible therethrough. As used herein, "optically transmissive" or "light-transmissive" may be used to refer to something that is transparent or translucent, or otherwise allows light or other electromagnetic radiation to propagate therethrough. In some cases, transparent materials or components may introduce some diffusion, lensing effects, distortions, or the like (e.g., due to surface textures) while still allowing objects or images to be seen through the materials or components, and such deviations are understood to be within the scope of the meaning of transparent. Also, materials that are transparent may be coated, painted, or otherwise treated to produce a non-transparent (e.g., opaque) component; in such cases the material may still be referred to as transparent, even though the material may be part of an opaque component. Translucent components may be formed by producing a textured or frosted surface on an otherwise transparent material (e.g., clear glass). Translucent materials may also be used, such as translucent polymers, translucent ceramics, or the like.

Various components of an electronic device 990 may be coupled to and/or positioned within the enclosure 900. For example, processing circuitry of the electronic device may be housed or positioned within an internal volume 921 of the enclosure 900. Additional components of the electronic device are discussed in more detail below with respect to FIG. 15. Although the enclosure 900 is pictured as having a rectangular shape, this is one example and is not meant to be limiting. In various embodiments, the electronic device may be and/or take the form of a personal computer, a notebook or laptop computer, a tablet, a smart phone, a watch, a case for an electronic device, a home automation device, and so on.

Figure 10A:
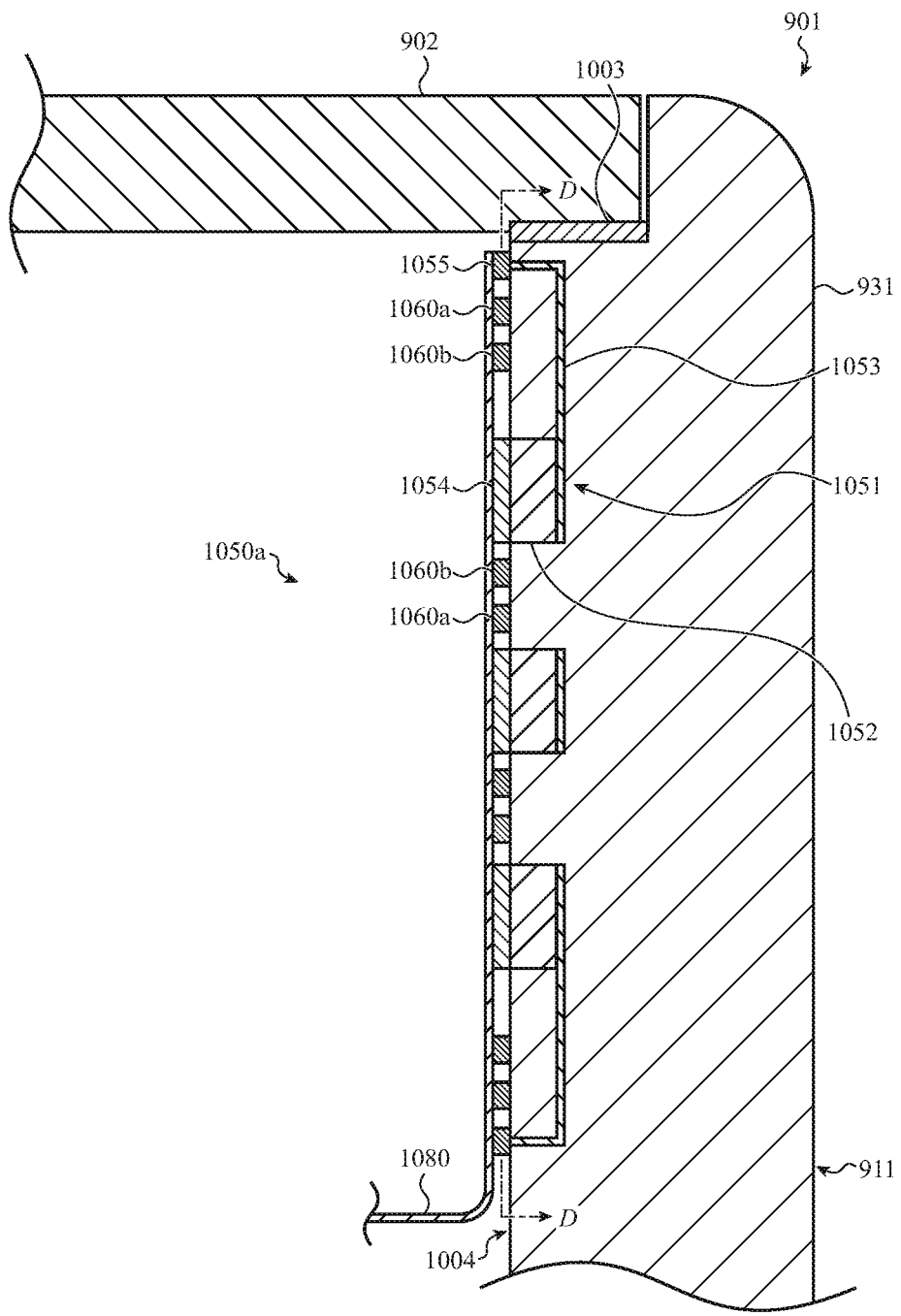
FIG. 10A depicts an example partial cross-sectional view of the electronic device depicted in FIG. 9, taken along section C-C.

In some embodiments, the enclosure component 901 defines a wall 931 (e.g., sidewall or enclosure wall) that defines at least a portion of an exterior surface 911 of the enclosure 900. FIG. 10A depicts an example partial cross-sectional view of the electronic device 990 depicted in FIG. 9, taken along section C-C. The electronic device 990 includes an input/output module 1050a. The input/output module 1050a includes one or more haptic actuators 1051, and one or more input electrodes 1060, 1070. In various embodiments, the input/output module 1050a may be at least partially integrated or integrally formed with the wall 931. For example, as shown in FIG. 10A, one or more haptic actuators 1051 may be formed within the structure of the wall 931. As previously mentioned, if the haptic actuator 1051 is formed form a ceramic (e.g., ceramic piezoelectric) material, the haptic actuator 1051 may be integrally formed with a structure of the enclosure by being co-fired or co-sintered with the wall 931 of the enclosure 900.

As shown in FIG. 10A, one or more input electrodes 1060a, 1060b may be deposited on or within the wall 931. For example, as shown in FIG. 10A, the input electrodes 1060a, 1060b may be deposited on an interior surface 1004 of the wall 931. Each input electrode 1060a, 1060b may be formed from a conductive material arranged in a pattern suitable to detect touch inputs, for example along a portion of the exterior surface located along the wall 931. For example, the input electrodes 1060a, 1060b may be arranged in square or rectangular shapes, such as described with respect to FIG. 10B. The input electrodes 1060a, 1060b alone or in combination with other electrodes may define an array of input electrodes. In some instances, at least a portion of the array of electrodes defines a touch sensor or a portion of the touch screen that is positioned below the cover (e.g., cover 902 of FIG. 9).

Figure 10B:
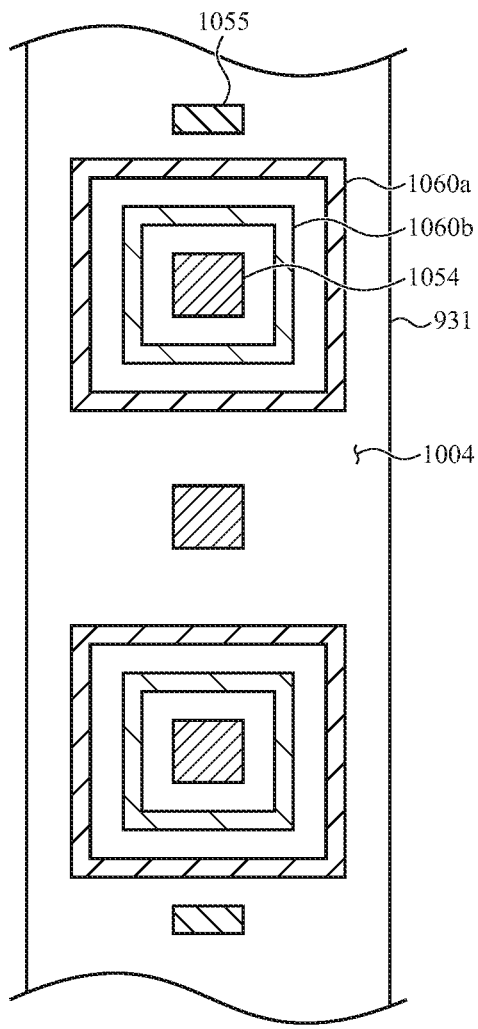
FIG. 10B depicts an example view of input electrodes deposited on an interior surface of a wall, taken through section D-D of FIG. 10A.

FIG. 10B depicts an example view of input electrodes deposited on the interior surface 1004 of the wall 931, taken through section D-D of FIG. 10A. As depicted, each input electrode 1060a, 1060b may be a touch- and/or strain-sensitive element, which may be a conductive trace deposited or otherwise formed on or within the wall 931. In some embodiments, one or more input electrodes are responsive to strain and may be configured to produce an electrical signal or have an electrical characteristic (e.g., resistance) that is responsive to a force applied to the wall 931. In some embodiments, one or more input electrodes are may be configured to produce an electrical signal or have an electrical characteristic (e.g., capacitance) that is responsive to a touch input applied along the wall 931.

The arrangement and function of the input electrodes 1060a, 106b may vary depending on the implementation. In some embodiments, input electrode 1060a is a touch-sensing input electrode and input electrode 1060b is a force-sensing input electrode. In some embodiments, the input electrodes 1060a, 1060b are touch-sensing and force-sensing electrodes. In various embodiments, the shape or geometry of an input electrode 1060 may vary. For example, an input electrode may be formed from a set of conductive traces arranged in a doubled-back spiral shape, a forked or comb-shaped configuration, a linear serpentine shape, a radial serpentine shape, a spiral shape, and so on. In these and other embodiments, the input electrode 1060a, 1060b may include conductive traces set in one or more sets of parallel lines.

Each input electrode 1060a, 1060b includes or is electrically coupled to one or more signal lines (e.g., one or more signal lines of a signal trace 1080). A signal generator may provide electrical signals to each input electrode 1060a, 1060b through the signal line(s). Processing circuitry may be coupled to the signal line(s) to detect a capacitive touch response and a resistive force response. For example, a presence and/or location of a touch input may be detected through a change in capacitance of an input electrode 1060a, 1060b, or across multiple input electrodes 1060a, 1060b (see FIGS. 3B and 4B, described above). Further, an amount of force may be detected using a change in resistance through an input electrode 1060a, 1060b to produce a non-binary force signal or output (see FIGS. 3C and 4C, described above).

The conductive material of the input electrodes 1060a, 1060b may include materials such as, but not limited to: gold, copper, copper-nickel alloy, copper-nickel-iron alloy, copper-nickel-manganese-iron alloy, copper-nickel-manganese alloy, nickel-chrome alloy, chromium nitride, a composite nanowire structure, a composite carbon structure, graphene, nanotube, constantan, karma, silicon, polysilicon, gallium alloy, isoelastic alloy, and so on. The conductive material of the input electrodes 1060a,b may be formed or deposited on a surface using a suitable disposition technique such as, but not limited to: vapor deposition, sputtering, printing, roll-to-roll processing, gravure, pick and place, adhesive, mask-and-etch, and so on. In some embodiments, the input electrodes may be co-fired with one or more components of the input/output module and/or the enclosure component 901, such as described below with respect to FIGS. 10C and 10D.

As described above, in some embodiments one or more signal lines may be included in a signal trace 1080. The signal lines may be formed of a similar material and in a similar process as the input electrodes 1060a, 1060b. In some embodiments, the input electrodes 1060a, 1060b and the signal lines are formed in a same processing step. In other embodiments, the input electrodes 1060a, 1060b are formed in one processing step and one or both signal lines are formed in a separate processing step. The input electrodes 1060a, 1060b and the signal lines may be arranged in any suitable pattern, such as a grid pattern, a circular pattern, or any other geometric pattern (including a non-regular pattern).

As discussed above, in various embodiments, localized haptic feedback may be provided by means of the one or more haptic actuators 1051 that are integrally formed with the wall 931. A haptic actuator 1051 may include a piezoelectric element 1052, a first electrode 1053, and a second electrode 1054. The second electrode 1054 (e.g., a conductive pad) may be formed from a conductive material deposited on the internal surface 1004 of the enclosure component 901. In some embodiments, the second electrode 1054 is integrally formed with the wall 931 and may define a conductive portion of the internal surface 1004. The first electrode 1053 may extend beyond and/or wrap around a portion of the piezoelectric element and couple to a conductive pad 1055 and/or a trace 1080. The conductive pad 1055 may be formed from a conductive material deposited on the internal surface 1004 and/or integrally formed with the wall 931. In some embodiments, the second electrode 1054 is integrally formed with the wall 931 and may define a conductive portion of the interior surface 1004.

One or more signal lines (e.g., signal trace 1080) may be conductively coupled with the conductive pad 1055, the first electrode 1053 and/or the second electrode 1054 to transmit actuation signals to each haptic actuator 1051. Accordingly, a potential may be applied across the piezoelectric element 1052—a reference voltage may be provided to the second electrode 1054; and an actuation signal may be provided to the first electrode 1053. In some embodiments, the first electrode 1053 may be coupled to a reference voltage and the second electrode 1054 may be coupled to an actuation signal. In various embodiments the reference voltage may be ground. The signal trace 1080 may couple the input electrodes 1060a, 1060b, the haptic actuators 1051, and/or other components of the electronic device 990 to one or more additional components of the electronic device 990. In some embodiments, the signal trace 1080 is coupled to processing circuitry disposed in the interior volume of the electronic device 990.

Each haptic actuator 1051 can be selectively activated in the embodiment shown in FIG. 10A. In particular, the second electrode 1054 can provide a reference voltage to a haptic actuator 1051, while each first electrode 1053 can apply an electrical signal across each individual piezoelectric element 1052 independently of the other piezoelectric elements 1052. In response to a drive voltage or signal, the haptic actuator 1051 (including piezoelectric element 1052) may produce a localized deflection or haptic output along the wall 931. The localized deflection or haptic output may be tactically perceptible through a touch of the user's finger or other part of the user's body. The localized deflection or haptic output may be provided in response to detecting a touch input along the exterior surface of the electronic device.

As described above, when a voltage is applied across the piezoelectric element 1052 (or other type of haptic actuator), the voltage may induce the piezoelectric element 1052 to expand or contract in a direction or plane substantially parallel to the interior surface 1004 and/or the exterior surface 911. For example, the properties of the piezoelectric element 1052 may cause the piezoelectric element 1052 to expand or contract along a plane substantially parallel to the interior surface 1004 and/or the exterior surface 911 when electrodes applying the voltage are placed on a top surface and bottom surface of the piezoelectric element 1052 parallel to the interior surface 1004 and/or the exterior surface 911.

Because the piezoelectric element 1052 is fixed with respect to the wall 931, as the piezoelectric element 1052 contracts along the plane parallel to the interior surface 1004 and/or the exterior surface 911, the piezoelectric element 1052 may bow and deflect in a direction orthogonal to the interior surface 1004 and/or the exterior surface 911 (e.g., rightward toward the exterior surface 911 with respect to FIG. 10A), thereby causing the wall 931 to bow and/or deflect to provide a haptic output. The haptic output may be localized to a portion of the exterior surface 911 close to the haptic actuator 1051 (e.g., a portion of the exterior surface 911 rightward of the haptic actuator 1051 with respect to FIG. 10A).

While the haptic actuator 1051 may be a piezoelectric actuator, different types of haptic actuators 1051 can be used in other embodiments. For example, in some embodiments, one or more piston actuators may be disposed within the wall 931, and so on. In various embodiments, when an actuation signal is applied to the haptic actuator 1051, the haptic actuator may actuate to cause the wall 931 to bow and/or deflect to produce a haptic output. For example, a piston of the actuator may move in a direction that is substantially perpendicular to the exterior surface 911 to create a deflection in the wall 931. The haptic output may be localized to a portion of the exterior surface 911 close to the haptic actuator 1051. In some embodiments, a piezoelectric actuator may change thickness in a direction that is substantially perpendicular to the exterior surface 911, which may in turn cause the wall 931 to bow and/or deflect to produce a haptic output.

The piezoelectric element 1052 may be formed from an appropriate piezoelectric material, such as potassium-based ceramics (e.g., potassium-sodium niobate. potassium niobate), lead-based ceramics (e.g., PZT, lead titanate), quartz, bismuth ferrite, and other suitable piezoelectric materials. The first electrode 1053, the second electrode 1054, and the conductive pad 1055 are typically formed from metal or a metal alloy such as silver, silver ink, copper, copper-nickel alloy, and so on. In other embodiments, other conductive materials can be used.

In some embodiments, the second electrode 1054 and the conductive pad 1055 are formed or deposited directly on the interior surface 1004 using a suitable disposition technique such as, but not limited to: vapor deposition, sputtering, printing, roll-to-roll processing, gravure, pick and place, adhesive, mask-and-etch, and so on.

In some embodiments, one or more components of the haptic actuator 1051, the conductive pad 1055, the trace 1080, and/or one or more input electrodes 1060 may be co-fired with the enclosure component 901 and/or other components of the electronic device 990. For example, the haptic actuator 1051 may be formed from a first ceramic material and the enclosure component 901 may be formed from a second housing material, and the haptic actuator 1051 and the enclosure component 901 may be heated at the same time to form a co-sintered or co-fired enclosure component. In some instances, the haptic actuator 1051 and enclosure component 901 may be heated to at least partially sinter or fuse the respective ceramic materials of each element. In some instances, the one or more components of the haptic actuator 1051, the conductive pad 1055, the trace 1080, and/or one or more input electrodes 1060 may be in a green, partially sintered, pre-sintered state prior to being heated together in a co-sintering or co-firing process.

Figure 10C:
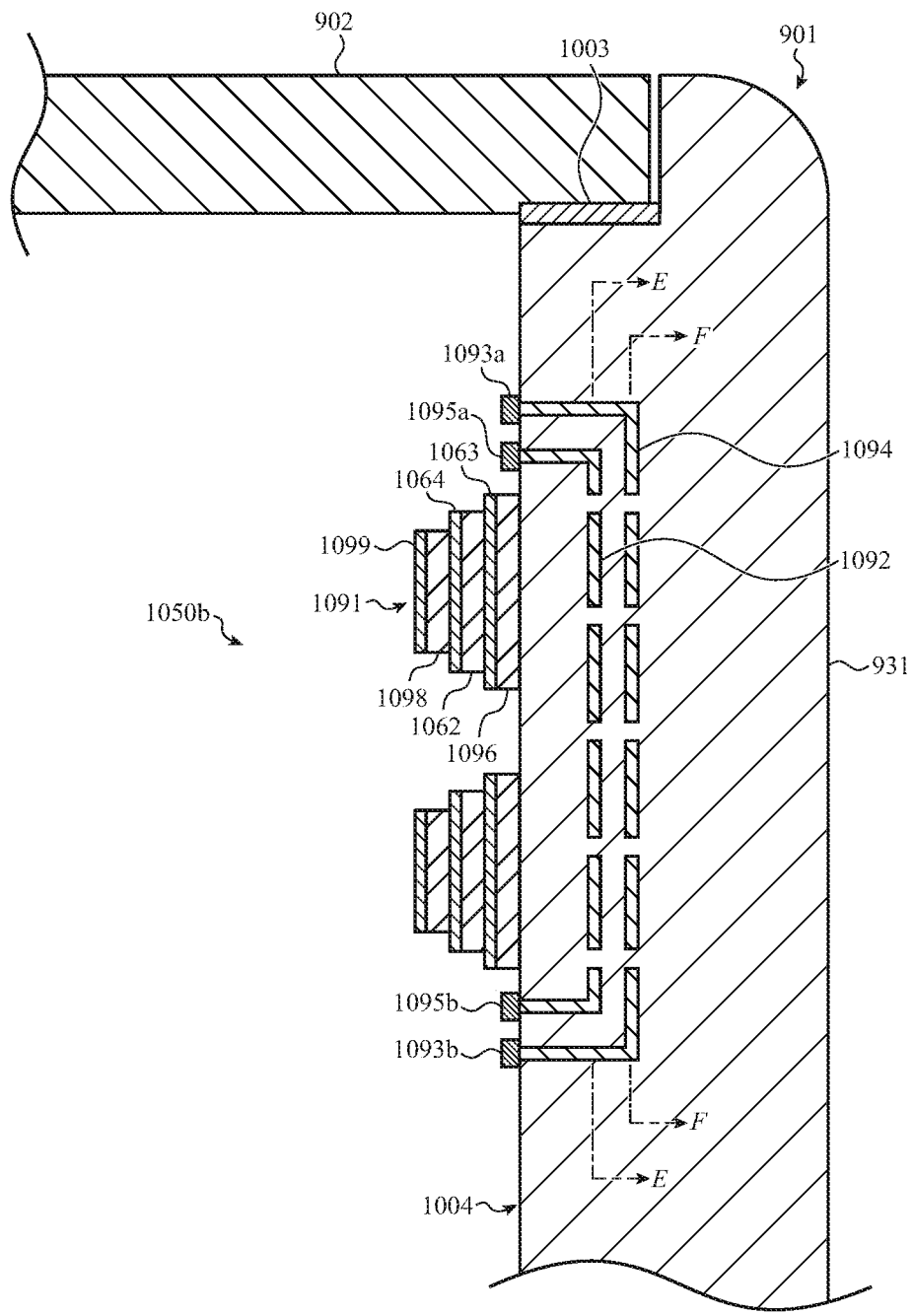
FIG. 10C depicts another example partial cross-sectional view of the electronic device depicted in FIG. 9, taken along section C-C.
Figure 10D:
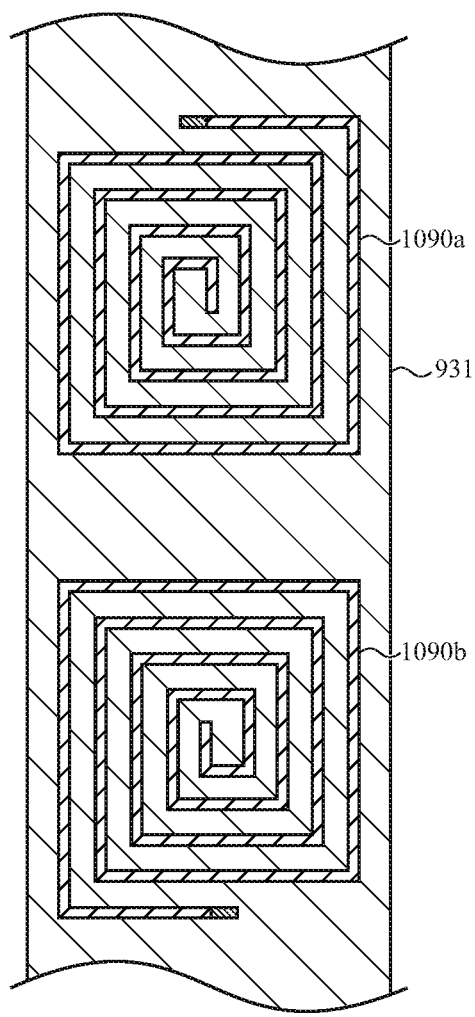
FIG. 10D depicts an example partial cross-sectional view showing example patterns of input electrodes.

FIG. 10C illustrates an example partial cross-sectional view of the electronic device 990 depicted in FIG. 9, taken along section C-C. The electronic device 990 includes an input/output module 1050*b*. The input/output module 1050*b* includes one or more haptic actuators 1091, and one or more input electrodes 1092, 1094. In various embodiments, one or more components of the input/output module 1050*b* may be integrally formed with the wall 931. For example, as shown in FIG. 10C, one or more input electrodes 1092, 1094 may be integrally formed within the wall 931 by co-firing or co-sintering the one or more input electrodes with the enclosure component 901. In various embodiments, one or more components of the input/output module 1050*b* may be integrally formed with the wall 931, even if not within the wall. For example, as shown in FIG. 10C, one or more haptic actuators 1091 may be integrally formed with the wall 931 (e.g., on the wall 931) by co-firing or co-sintering the one or more input electrodes with the enclosure component 901.

The wall 931 defines at least a portion of an exterior surface of the enclosure 900 that is configured to receive a contact from a user. Integrally forming an input electrode within a wall of the enclosure allows for localized touch input and force input detection at select locations along the exterior surface of the enclosure. Integrally forming a haptic actuator within a wall of the enclosure allows for localized haptic output (e.g., localized deflection of the wall 931) at select locations along the exterior surface of the enclosure.

As discussed above, in various embodiments, localized haptic feedback may be provided by means of the one or more haptic actuators 1091. A haptic actuator 1091 may be similar to the haptic actuator 1051 discussed above with respect to FIG. 10A. The haptic actuator 1091 may include a piezoelectric element 1062, a first electrode 1063, and a second electrode 1064. In some embodiments, the haptic actuator 1091 may include one or more buffer elements (e.g., a first buffer element 1096 and a second buffer element 1098). As previously mentioned, if the haptic actuator 1051 is formed form a ceramic (e.g., ceramic piezoelectric) material, the haptic actuator 1051 may be integrally formed with a structure of the enclosure by being co-fired or co-sintered with the wall 931 of the enclosure 900. In some embodiments, the haptic actuators 1091 are positioned on the interior surface 1004 of the wall 931.

One or more signal lines may be conductively coupled with the first electrode 1063 and/or the second electrode 1064 to transmit actuation signals to each haptic actuator 1091. Accordingly, a potential may be applied across the piezoelectric element 1062—a reference voltage may be provided to the second electrode 1064; and an actuation signal may be provided to the first electrode 1063. In some embodiments, the first electrode 1063 may be coupled to a reference voltage and the second electrode 1064 may be coupled to an actuation signal. In various embodiments the reference voltage may be ground. In response to a drive voltage or signal, the haptic actuator 1091 may produce a localized deflection or haptic output along the wall 931. The localized deflection or haptic output may be tactically perceptible through a touch of the user's finger or other part of the user's body.

Similar to the haptic actuators described above, the haptic actuator 1091 may be fixed with respect to the wall 931. Because the piezoelectric element 1062 is fixed with respect to the wall 931, as the piezoelectric element 1062 contracts along the plane parallel to the interior surface 1004 and/or the exterior surface 911, the piezoelectric element 1062 may bow and deflect in a direction orthogonal to the interior surface 1004 and/or the exterior surface 911 (e.g., rightward toward the exterior surface 911 with respect to FIG. 10C), thereby causing the wall 931 to bow and/or deflect. The haptic feedback may be localized to a portion of the exterior surface 911 close to the haptic actuator 1091 (e.g., a portion of the exterior surface 911 rightward of the haptic actuator 1091 with respect to FIG. 10C).

The input electrodes 1092, 1094, 1099 may be similar to the input electrodes discussed herein (e.g., input electrodes 1060*a*, 1060*b*). In some embodiments, the input electrodes 1092, 1094 may be integrally formed with the wall 931, for example by co-firing the input electrodes with the enclosure component 901. The input electrodes 1099 may be deposited on a buffer element, such as buffer element 1098.

Each input electrode 1092, 1094, 1099 may be formed from a conductive material arranged in a pattern suitable to detect inputs. For example, the input electrodes 1092, 1094, 1099 may be arranged in spiral shapes, such as described with respect to FIG. 10D. The input electrodes 1092, 1094, 1099 alone or in combination with other electrodes may define an array of input electrodes. In some instances, at least a portion of the array of electrodes defines a touch sensor or a portion of the touch screen that is positioned below the cover (e.g., cover 902 of FIG. 9).

FIG. 10D depicts an example partial cross-sectional view showing example patterns of the input electrodes 1092 taken along section E-E. FIG. 10D also depicts an example partial cross-sectional view showing example patterns of the input electrodes 1094 taken along section F-F. As depicted, each input electrode 1092, 1094, 1099 may be a touch- and/or strain-sensitive element 1090a, 1090b, which may be a conductive trace deposited or otherwise formed on or within the wall 931. In some embodiments, one or more input electrodes are responsive to strain and may be configured to produce an electrical signal or have an electrical characteristic (e.g., resistance) that is responsive to a force applied to the wall 931. In some embodiments, one or more input electrodes are may be configured to produce an electrical signal or have an electrical characteristic (e.g., capacitance) that is responsive to a touch input applied along the wall 931.

The arrangement and function of the input electrodes 1092, 1094, 1099 may vary depending on the implementation. In some embodiments, input electrode 1092 is a touch-sensing input electrode and input electrodes 1094 and 1099 are force-sensing input electrodes. In some embodiments, the input electrodes 1092, 1094 are touch-sensing and force-sensing electrodes. In some embodiments, the input/output module 1050b includes a subset of the input electrodes 1092, 1094, and 1099. For example, the input/output module 1050b may include a touch-sensing input electrode 1092 and a force-sensing input electrode 1094. As another example, the input/output module 1050b may include a touch-sensing input electrode 1092 and a force-sensing input electrode 1099.

In some embodiments, the input electrodes are arranged in spiral shapes, such as elements 1090a, 1090b shown in FIG. 10D. In various embodiments, the shape or geometry of an input electrode 1092, 1094 may vary. For example, an input electrode may be formed from a set of conductive traces arranged in a doubled-back spiral shape, a forked or comb-shaped configuration, a linear serpentine shape, a radial serpentine shape, a spiral shape, and so on. In these and other embodiments, the input electrode 1092, 1094 may include conductive traces set in one or more sets of parallel lines.

Each input electrode 1092, 1094 includes or is electrically coupled to one or more signal lines (e.g., one or more signal lines of a signal trace). For example, returning to FIG. 10C, the input electrodes 1092, 1094 may be coupled to one or more conductive pads 1095a,b and 1093a, 1060b, respectively. A signal generator may provide electrical signals to each input electrode 1092, 1094 through the signal line(s), for example via the conductive pads 1093, 1095. The conductive pads 1093, 1095 may be formed from a conductive material deposited on the internal surface 1004 and/or integrally formed with the wall 931. Processing circuitry may be coupled to the signal line(s) to detect a capacitive touch response and a resistive force response. That is, a presence and location of a touch input may be detected through a change in capacitance of an input electrode 1092, 1094, or across multiple input electrodes 1092, 1094 (see FIGS. 3B and 4B, described above). Further, an amount of force may be detected using a change in resistance through an input electrode 1092, 1094 to produce a non-binary force signal or output (see FIGS. 3C and 4C, described above).

The conductive material of the input electrodes 1092, 1094 may include materials such as, but not limited to: gold, copper, copper-nickel alloy, copper-nickel-iron alloy, copper-nickel-manganese-iron alloy, copper-nickel-manganese alloy, nickel-chrome alloy, chromium nitride, a composite nanowire structure, a composite carbon structure, graphene, nanotube, constantan, karma, silicon, polysilicon, gallium alloy, isoelastic alloy, and so on. The conductive material of the input electrodes 1092, 1094 may be formed or deposited on a surface using a suitable disposition technique such as, but not limited to: vapor deposition, sputtering, printing, roll-to-roll processing, gravure, pick and place, adhesive, mask-and-etch, and so on. In some embodiments, the input electrodes may be co-fired with one or more components of the input/output module and/or the enclosure component 901.

The signal trace may couple the input electrodes 1092, 1094, the haptic actuators 1091, and/or other components of the electronic device 990 to one or more additional components of the electronic device 990. In some embodiments, the signal trace is coupled to processing circuitry disposed in the interior volume of the electronic device 990.

In some embodiments, one or more components of the haptic actuator 1091 and/or one or more input electrodes 1092, 1094 may be co-fired with the enclosure component 901 and/or other components of the electronic device 990. For example, the haptic actuator 1091 may be formed from a first ceramic material and the enclosure component 901 may be formed from a second housing material, and the haptic actuator 1091 and the enclosure component 901 may be heated at the same time to form a co-sintered or co-fired enclosure component. In some instances, the haptic actuator 1091 and enclosure component 901 may be heated to at least partially sinter or fuse the respective ceramic materials of each element. In some instances, the one or more components of the haptic actuator 1091, the contact pad 1093, 1095, and/or one or more input electrodes 1092, 1094 may be in a green, partially sintered, pre-sintered state prior to being heated together in a co-sintering or co-firing process.

In the example embodiment shown in FIG. 10A-10B, the input/output module 1050a includes three haptic actuators and four input electrodes. In the example embodiment shown in FIG. 10C-10D, the input/output module 1050b includes two haptic actuators and two input electrodes. These are example configurations, and in various embodiments, the input/output module (s) may include more or fewer haptic actuators and/or more or fewer input electrodes. The input/output modules 1050a, 1050b are shown in FIGS. 10A-10D as being at least partially disposed in the wall 931 of the electronic device 990. These are examples of placement of the input/output module. In various embodiments, the input/output module(s) may be positioned at any suitable location in an electronic device. For example, the input/output module may be positioned on or within and/or integrally formed with one or more covers of the electronic device or any other suitable components.

The relative position of the various layers described above may change depending on the embodiment. Some layers may be omitted in other embodiments. Other layers may not be uniform layers of single materials, but may include additional layers, coatings, and/or be formed from composite materials. For example, an insulation layer may encapsulate one or more components of the input/output module 1050a to protect from corrosion and/or electrical interference. As another example, the electronic device 990 may include a layer 1003 between the cover 902 and the enclosure component 901. In various embodiments, the layer 1003 is an adhesive and/or compliant layer. In some embodiments, the layer 1003 is a gasket that forms a seal (e.g., a watertight and/or airtight seal) around a perimeter of the cover 902. The electronic device may include additional layers and components, such as processing circuitry, a signal generator, a battery, etc., which have been omitted from FIGS. 10A-10D for clarity.

As described above, an input/output module may be disposed in any electronic device. In one embodiment, the input/output module is disposed in a wearable electronic device such as a watch. FIG. 11 depicts an example wearable electronic device 1100 that may incorporate an input/output module as described herein.

In the illustrated embodiment, the electronic device 1100 is implemented as a wearable computing device (e.g., an electronic watch). Other embodiments can implement the electronic device differently. For example, the electronic device can be a smart telephone, a gaming device, a digital music player, a device that provides time, a health assistant, and other types of electronic devices that include, or can be connected to a sensor(s).

Figure 11:
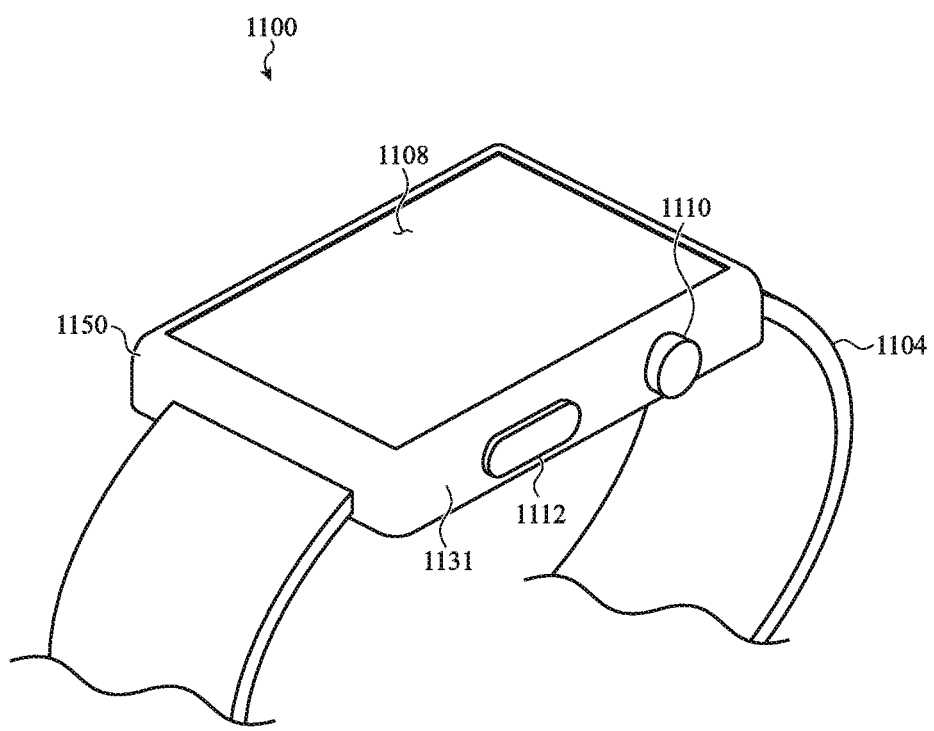
FIG. 11 depicts an example wearable electronic device that may incorporate an input/output module as described herein.
Figure 15:
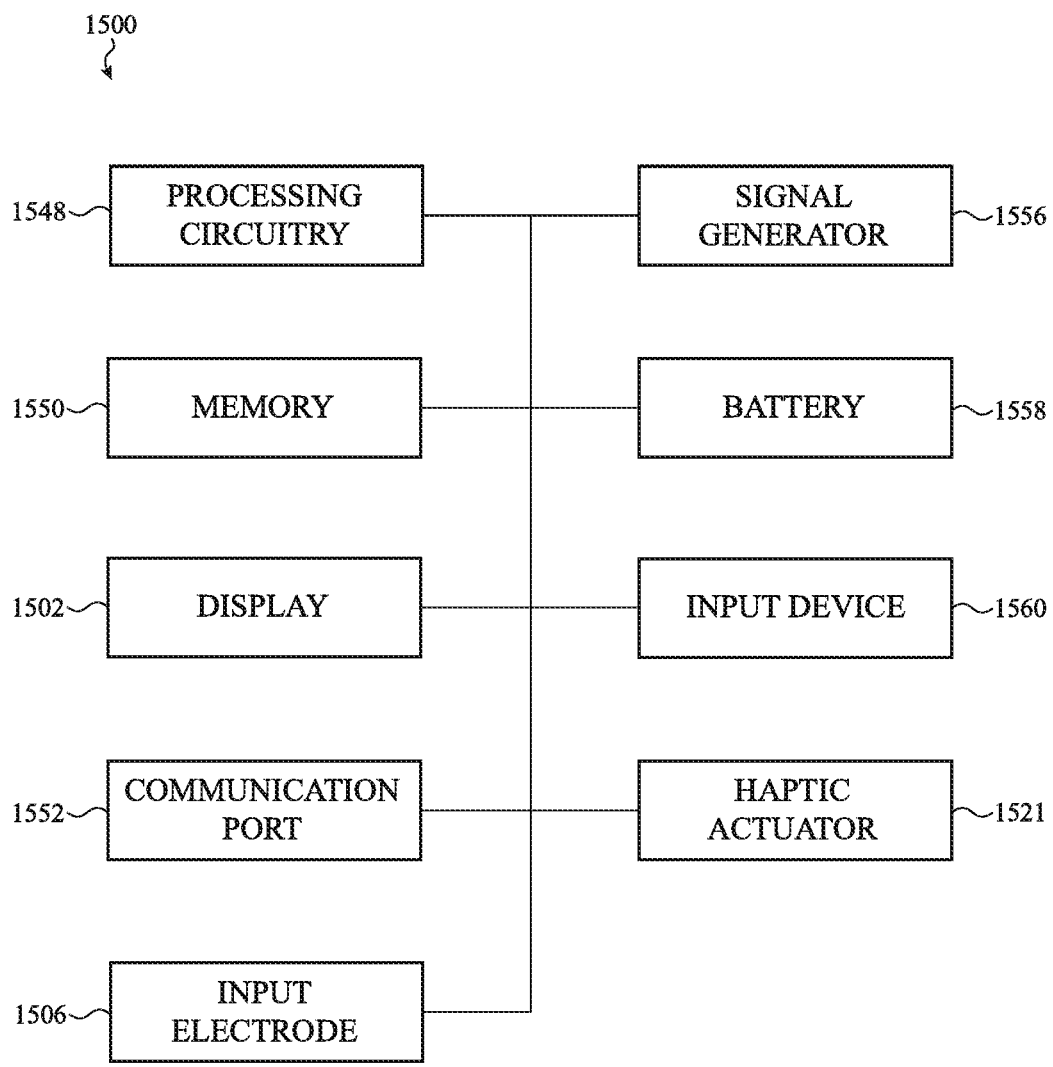
FIG. 15 depicts example components of an electronic device in accordance with the embodiments described herein.

In the embodiment of FIG. 11, the wearable electronic device 1100 includes an enclosure 1150 at least partially surrounding a display 1108, a watch crown 1110, and one or more buttons 1112. The wearable electronic device 1100 may also include a band 1104 that may be used to attach the wearable electronic device to a user. The display 1108 may be positioned at least partially within an opening defined in the enclosure 1150. A cover may be disposed over the display 1108. The wearable electronic device 1100 can also include one or more internal components (not shown) typical of a computing or electronic device, such as, for example, processing circuitry, memory components, network interfaces, and so on. FIG. 15 depicts an example computing device, the components of which may be included in the wearable electronic device 1100.

In various embodiments, the wearable electronic device 1100 may include an input/output module such as those described herein. For example, the input/output module may be positioned on or within a wall 1131, the display 1108 and/or a cover disposed over the display, the band 1104, the watch crown 1110, the button 1112, or substantially any other surface of the wearable electronic device 1100.

In various embodiments, the wearable electronic device 1100 may display graphical outputs. For example, processing circuitry of the wearable electronic device may direct the display 1108 to provide a graphical output. Similarly, in some embodiments, the display 1108 is configured to receive inputs as a touch screen style display. In various embodiments, the input/output module may provide outputs and/or detect inputs in relation to graphical outputs provided at the display, inputs received at the wearable electronic device 1100, and so on.

Figure 12:
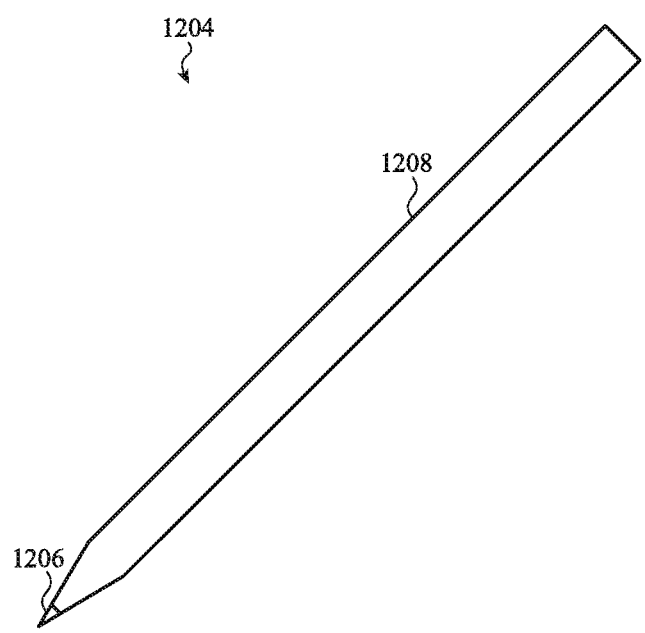
FIG. 12 depicts an example input device that may incorporate an input/output module as described herein.

FIG. 12 depicts an example input device 1204 that may incorporate an input/output module as described herein. The input device 1204 may be used to provide input to an additional electronic device, for example, through interaction with a touch-sensitive surface. The input device 1204 may be a stylus keyboard, trackpad, touch screen, three-dimensional input systems (e.g., virtual or augmented reality input systems), or other corresponding input structure. A user may manipulate an orientation and position of the electronic device 1204 relative to the touch-sensitive surface to convey information to the additional electronic device such as, but not limited to, writing, sketching, scrolling, gaming, selecting user interface elements, moving user interface elements, and so on. The touch-sensitive surface may be a multi-touch display screen or a non-display input surface (e.g., such as a trackpad or drawing tablet) as may be appropriate for a given application.

FIG. 12 generally shows the input device 1204 having a long, narrow, or elongated body or enclosure 1208 coupled to the tip 1206 (although the exact shape of the stylus may widely vary). The enclosure 1208 may extend along a longitudinal axis of a stylus body or other structure having an exterior surface that is configured for manipulation by a user as a writing implement. For example, the exterior surface of the enclosure 1208 may be a hoop, shell, or other substantially cylindrical structure that may be gripped by a user in order to use the input device 1204 as a writing instrument. The tip 1206 may be configured to move relative to the enclosure 1208 in response to a force input.

In various embodiments, the input device 1204 may include one or more input/output modules as described herein. For example, an input/output module may be positioned on or in the enclosure 1208, for example on or in a wall of the enclosure 1208. The input/output module may detect inputs and/or provide haptic outputs at a surface of the input device 1204.

Figure 13:
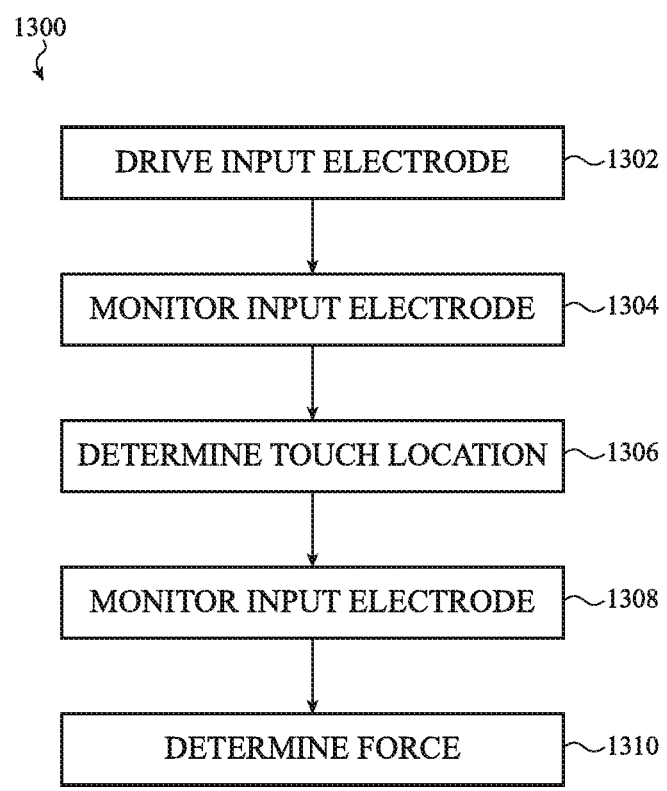
FIG. 13 depicts an example method for detecting a location of a touch and an amount of force corresponding to the touch with a single module.

FIG. 13 depicts an example method for detecting a location of a touch input and an amount of force corresponding to the touch input with a single module. As described above, touch input and force input may be detected through input electrodes disposed on a single layer of an input/output module of an input device, though this is not required.

The method begins at operation 1302, in which an input electrode is driven by a drive signal. The input electrode may be driven by an alternating current drive signal or a direct current drive signal. In some embodiments, the input electrode may be driven by a first drive signal (e.g., a drive signal having a first waveform, which may include A/C and/or D/C components, and may have a given amplitude, shape, and/or frequency) during a first period of time, and a different second drive signal (e.g., a drive signal having a second waveform, which may include A/C and/or D/C components, and may have a given amplitude, shape, and/or frequency) during a second period of time. In some embodiments, the input device may include a set or array of input electrodes. Each input electrode may be driven by the drive signal, or some input electrodes may be driven while others are not. The input electrodes may be driven by a same drive signal, or by distinct drive signals (e.g., drive signals having different waveforms).

Next, at operation 1304, the input electrode is monitored (e.g., by processing circuitry). Generally, the input electrode is monitored for a change in an electrical parameter, such as capacitance. Where the input device includes multiple input electrodes, all input electrodes may be monitored concurrently, or the input electrodes may be monitored during distinct time periods.

Next, at operation 1306, a touch location is determined. As the input electrodes are monitored, a change in capacitance may be detected, indicating a finger or other object has approached or come in contact with an input surface (e.g., defined by a cover) of the input device. The location of the touch may be determined based on a location corresponding to the input electrode(s) which detected the change in capacitance.

Next, at operation 1308, the input electrode is monitored for a change in another electrical parameter, such as resistance. Where the input device includes multiple input electrodes, all input electrodes may be monitored concurrently, or the input electrodes may be monitored during distinct time periods.

Lastly, at operation 1310, an amount of force is determined. As the input electrodes are monitored, a non-binary change in resistance may be detected, indicating a force has been applied to the cover. A non-binary amount of the force may be estimated or determined based on the change in resistance detected. In some embodiments, a location of the force may be determined based on a location corresponding to the input electrode(s) which detected the change in resistance.

One may appreciate that although many embodiments are disclosed above, the operations and steps presented with respect to methods and techniques are meant as exemplary and accordingly are not exhaustive. One may further appreciate that alternate operation order or fewer or additional operations may be required or desired for particular embodiments.

Figure 14:
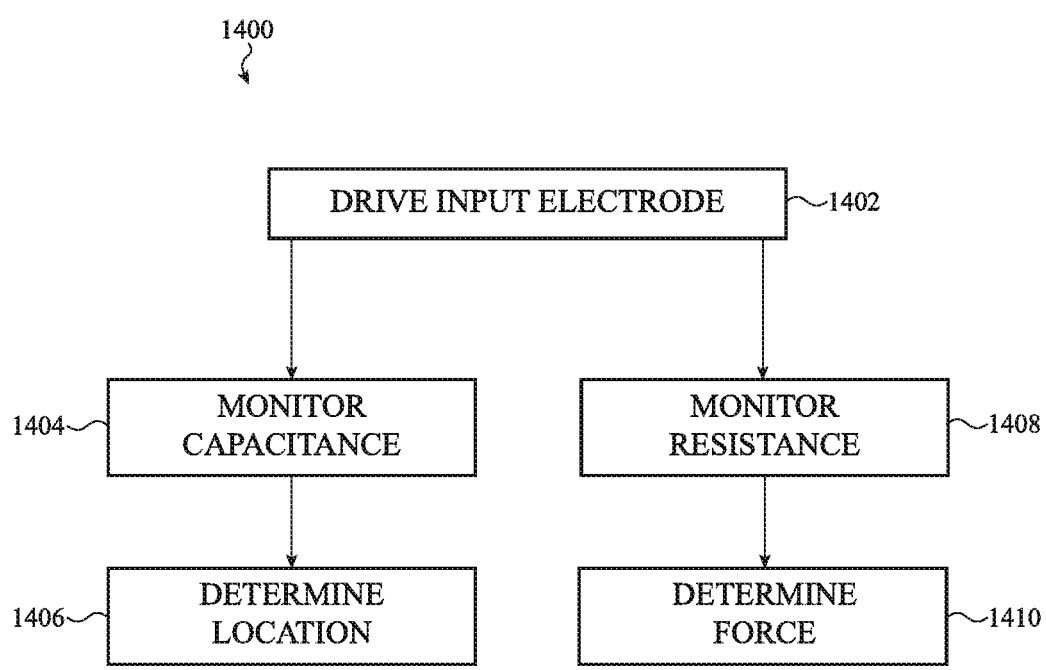
FIG. 14 depicts another example method for detecting a location of a touch and an amount of force corresponding to the touch with a single module.

For example, FIG. 14 depicts another example method for detecting a location of a touch and an amount of force corresponding to the touch with a single module.

The method begins at operation 1402, in which an input electrode is driven by a drive signal. The input electrode may be driven by an alternating current drive signal or a direct current drive signal. In some embodiments, the input device may include a set or array of input electrodes. Each input electrode may be driven by the drive signal, or some input electrodes may be driven while others are not. The input electrodes may be driven by a same drive signal, or by distinct drive signals (e.g., drive signals having different waveforms).

Next, at operation 1404, the input electrode is monitored (e.g., by processing circuitry). Generally, the input electrode is monitored for a change in capacitance. Next, at operation 1406, a touch location is determined. As the input electrodes are monitored, a change in capacitance may be detected, and a touch location may be determined based on a location corresponding to the input electrode(s) which detected the change in capacitance.

At operation 1408, which may occur concurrently with operation 1404 and/or operation 1406, the input electrode is monitored for a change in resistance. Lastly, at operation 1410, which may occur concurrently with operation 1404 and/or operation 1406, an amount of force is determined. As the input electrodes are monitored, a non-binary change in resistance may be detected, indicating a force has been applied to the cover. A non-binary amount of the force, may be estimated or determined based on the change in resistance detected.

FIG. 15 depicts example components of an electronic device in accordance with the embodiments described herein. The schematic representation depicted in FIG. 15 may correspond to components of the devices depicted in FIGS. 1-10, described above. However, FIG. 15 may also more generally represent other types of electronic devices with an integrated input/output module that receives touch and/or force inputs and provides localized deflection at a surface.

As shown in FIG. 15, a device 1500 includes an input electrode 1506 which detects touch and/or force inputs. The input electrode 1506 may receive signals from a signal generator 1556, and output response signals to processing circuitry 1548. The response signals may indicate touch inputs through changes in capacitance, and may further indicate force inputs through changes in resistance.

The device 1500 also includes processing circuitry 1548. The processing circuitry 1548 is operatively connected to components of the device 1500, such as an input electrode 1506. The processing circuitry 1548 is configured to determine a location of a finger or touch over an input surface (e.g., defined by a cover) of the device 1500, based on signals received from the input electrode 1506.

The processing circuitry 1548 may also be configured to receive force input from the input electrode 1506 and determine a non-binary amount of force based on signals received from the input electrode 1506. In accordance with the embodiments described herein, the processing circuitry 1548 may be configured to operate using a dynamic or adjustable force threshold.

In addition the processing circuitry 1548 may be operatively connected to computer memory 1550. The processing circuitry 1548 may be operatively connected to the memory 1550 component via an electronic bus or bridge. The processing circuitry 1548 may include one or more computer processors or microcontrollers that are configured to perform operations in response to computer-readable instructions. The processing circuitry 1548 may include a central processing unit (CPU) of the device 1500. Additionally or alternatively, the processing circuitry 1548 may include other processors within the device 1500 including application specific integrated chips (ASIC) and other microcontroller devices. The processing circuitry 1548 may be configured to perform functionality described in the examples above.

The memory 1550 may include a variety of types of non-transitory computer-readable storage media, including, for example, read access memory (RAM), read-only memory (ROM), erasable programmable memory (e.g., EPROM and EEPROM), or flash memory. The memory 1550 is configured to store computer-readable instructions, sensor values, and other persistent software elements.

In this example, the processing circuitry 1548 is operable to read computer-readable instructions stored on the memory 1550. The computer-readable instructions may adapt the processing circuitry 1548 to perform the operations or functions described above with respect to FIGS. 1-10. The computer-readable instructions may be provided as a computer-program product, software application, or the like.

The device 1500 may also include a battery 1558 that is configured to provide electrical power to the components of the device 1500. The battery 1558 may include one or more power storage cells that are linked together to provide an internal supply of electrical power. The battery 1558 may be operatively coupled to power management circuitry that is configured to provide appropriate voltage and power levels for individual components or groups of components within the device 1500. The battery 1558, via power management circuitry, may be configured to receive power from an external source, such as an alternating current power outlet. The battery 1558 may store received power so that the device 1500 may operate without connection to an external power source for an extended period of time, which may range from several hours to several days.

In some embodiments, the device 1500 also includes a display 1502 that renders visual information generated by the processing circuitry 1548. The display 1502 may include a liquid-crystal display, light-emitting diode, organic light emitting diode display, organic electroluminescent display, electrophoretic ink display, or the like. If the display 1502 is a liquid-crystal display or an electrophoretic ink display, the display may also include a backlight component that can be controlled to provide variable levels of display brightness. If the display 1502 is an organic light-emitting diode or organic electroluminescent type display, the brightness of the display 1502 may be controlled by modifying the electrical signals that are provided to display elements.

In some embodiments, the device 1500 includes one or more input devices 1560. The input device 1560 is a device that is configured to receive user input. The input device 1560 may include, for example, a push button, a touch-activated button, or the like. In some embodiments, the input devices 1560 may provide a dedicated or primary function, including, for example, a power button, volume buttons, home buttons, scroll wheels, and camera buttons. Generally, an input electrode may also be classified as an input component. However, for purposes of this illustrative example, the input electrode 1506 is depicted as a distinct component within the device 1500.

The device 1500 may also include a haptic actuator 1521. The haptic actuator 1521 may be implemented as described above, and may be a ceramic piezoelectric transducer. The haptic actuator 1521 may be controlled by the processing circuitry 1548, and may be configured to provide haptic feedback to a user interacting with the device 1500.

The device 1500 may also include a communication port 1552 that is configured to transmit and/or receive signals or electrical communication from an external or separate device. The communication port 1552 may be configured to couple to an external device via a cable, adaptor, or other type of electrical connector. In some embodiments, the communication port 1552 may be used to couple the device 1500 to a host computer.

The device 1500 may also include a signal generator 1556. The signal generator 1556 may be operatively connected to the input electrode 1506 and the haptic actuator 1521. The signal generator 1556 may transmit electrical signals to the haptic actuator 1521 and the input electrode 1506. The signal generator 1556 is also operatively connected to the processing circuitry 1548. The processing circuitry 1548 is configured to control the generation of the electrical signals for the haptic actuator 1521 and the input electrode 1506. In some embodiments, distinct signal generators 1556 may be connected to the input electrode 1506 and the haptic actuator 1521.

The memory 1550 can store electronic data that can be used by the signal generator 1556. For example, the memory 1550 can store electrical data or content, such as timing signals, algorithms, and one or more different electrical signal characteristics that the signal generator 1556 can use to produce one or more electrical signals. The electrical signal characteristics include, but are not limited to, an amplitude, a phase, a frequency, and/or a timing of an electrical signal. The processing circuitry 1548 can cause the one or more electrical signal characteristics to be transmitted to the signal generator 1556. In response to the receipt of the electrical signal characteristic(s), the signal generator 1556 can produce an electrical signal that corresponds to the received electrical signal characteristic(s).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

What is claimed is:

1. An electronic device, comprising:
   a cover defining an input surface;
   an input/output module positioned below the cover and comprising:
     a substrate defining a first surface and a second surface opposite the first surface;
     a row of input electrodes on the substrate and extending along a first direction, the row of input electrodes comprising:
       a first input electrode coupled to the first surface of the substrate; and
       a second input electrode coupled to the first surface of the substrate adjacent the first input electrode;
     a column of input electrodes on the substrate and extending along a second direction different from the first direction, the column of input electrodes comprising:
       the first input electrode; and
       a third input electrode coupled to the first surface of the substrate adjacent the first input electrode; and
     a piezoelectric element coupled to the second surface of the substrate and configured to cause a deflection of the cover in response to an actuation signal; and
   a processing circuit operably coupled to the first, second and third input electrodes, and configured to:
     drive the first input electrode with a first electrical signal during a first period of time;
     drive the first input electrode with a second electrical signal during a second, non-overlapping period of time;
     detect a touch on the input surface based on a capacitive response to the first electrical signal during the first period of time;
     detect an amount of force of the touch based on a resistive response to the second electrical signal during the second, non-overlapping period of time, the resistive response resulting from a deformation of the first input electrode; and
     cause the actuation signal in response to at least one of the detected touch or the detected amount of force.

2. The electronic device of claim 1, wherein:
   in response to the actuation signal, the piezoelectric element contracts along a first direction; and
   the contraction along the first direction causes the deflection in the cover along a second direction that is transverse to the first direction.

3. The electronic device of claim 1, wherein the first, second and third input electrodes are formed from a piezoresistive material deposited on the substrate in a spiral pattern.

4. The electronic device of claim 1, wherein:
   the touch forms a touch capacitance between a touching object and the first and second input electrodes; and
   the touch capacitance causes a change in capacitance between the first and second input electrodes.

5. The electronic device of claim 1, wherein:
   the cover comprises an opaque layer;
   the first, second and third input electrodes each comprise a metal; and
   the piezoelectric element comprises an opaque material.

6. The electronic device of claim 1, wherein:
the cover is optically transparent;
the input/output module is optically transparent; and
the electronic device further comprises a display positioned below the input/output module that is viewable through the input/output module and the cover.

7. A method of determining a location and an amount of force corresponding to a touch on an input surface of an electronic device, comprising:
driving a first input electrode with a drive signal, the first input electrode positioned within a first row of multiple rows of input electrodes, each row of the multiple rows extending along a first direction on a surface of a substrate;
monitoring a second input electrode for a capacitive response to the drive signal resulting from the touch, the second input electrode positioned within the first row of the multiple rows of input electrodes and on the surface of the substrate;
determining the location corresponding to the touch based on the capacitive response;
monitoring the first input electrode for a first resistive response to the drive signal resulting from the touch, the first resistive response caused by a deformation of the first input electrode;
monitoring the second input electrode for a second resistive response to the drive signal resulting from the touch, the second resistive response caused by deformation of the second input electrode; and
determining a first amount of force corresponding to the touch based on the first resistive response and a second amount of force corresponding to the touch based on the second resistive response.

8. The method of claim 7, further comprising actuating a piezoelectric element coupled to the substrate in response to the amount of force exceeding a threshold.

9. The method of claim 7, wherein:
the monitoring the second input electrode for the capacitive response occurs during a first period of time;
the monitoring the first input electrode for the first resistive response occurs during a second period of time; and
the first period of time and the second period of time at least partially overlap.

10. The method of claim 7, wherein the monitoring the second input electrode for the capacitive response occurs during a first period of time and the monitoring the first input electrode for the first resistive response occurs during a second, non-overlapping period of time.

11. The method of claim 7, wherein:
the drive signal comprises a first waveform during a first time period and a second waveform, different from the first waveform, during a second time period;
the monitoring the second input electrode for the capacitive response occurs during the first time period; and
the monitoring the first input electrode for the first resistive response occurs during the second time period.

12. The method of claim 7, further comprising actuating a piezoelectric element in response to the amount of force exceeding a threshold, the actuating the piezoelectric element comprising:
causing the piezoelectric element to change length along a first direction; and
the change in length along the first direction causing a deflection of the input surface along a second direction that is transverse to the first direction.

13. An input device, comprising:
a cover defining an input surface external to the input device;
a substrate coupled to the cover and comprising a top surface facing the cover and a bottom surface opposite the top surface;
a row of input electrodes on the top surface of the substrate and extending along a first direction, the row of input electrodes comprising a first input electrode and a second input electrode;
a column of input electrodes on the top surface of the substrate and extending along a second direction different from the first direction, the column of input electrodes comprising the first input electrode and a third input electrode;
a piezoelectric element coupled to the bottom surface and configured to cause a deflection of the cover in response to an actuation signal; and
a processing circuit operably coupled to the first, second and third input electrodes and configured to detect a location of a touch on the input surface and an amount of force corresponding to:
drive the first input electrode with a first electrical signal during a first period of time;
drive the first input electrode with a second electrical signal during a second, non-overlapping period of time;
detect a touch on the input surface based on a capacitive response to the first electrical signal during the first period of time; and
detect an amount of force of the touch based on a resistive response to the second electrical signal during the second, non-overlapping period of time, the resistive response resulting from a deformation of the first input electrode.

14. The input device of claim 13, wherein:
the first input electrode comprises a first set of parallel conductive traces;
the second input electrode comprises a second set of parallel conductive traces; and
the first and second input electrodes are each deposited on the substrate.

15. The input device of claim 13, further comprising a conductive layer deposited on the bottom surface wherein the piezoelectric element is coupled to a bottom of the conductive layer.

16. The input device of claim 15, wherein:
the conductive layer comprises an array of conductive pads; and
a bottom of the piezoelectric element is coupled to a flexible circuit layer.

17. The input device of claim 15, wherein:
the conductive layer comprises an array of conductive pads; and
the piezoelectric element is electrically coupled to two conductive pads of the array of conductive pads.

18. The input device of claim 17, wherein the piezoelectric element is coupled to the array of conductive pads by an anisotropic conductive film.

* * * * *

UNITED STATES PATENT AND TRADEMARK OFFICE
CERTIFICATE OF CORRECTION

PATENT NO. : 11,054,932 B2
APPLICATION NO. : 16/102557
DATED : July 6, 2021
INVENTOR(S) : Qiliang Xu et al.

It is certified that error appears in the above-identified patent and that said Letters Patent is hereby corrected as shown below:

In the Claims

Column 38, Line 23, Claim 13 should read:
"and third input electrodes and configured to:"

Column 38, Line 24, Claim 13 should read:
"location of a touch on the input surface and an amount"

Column 38, Line 25, Claim 13 should read:
"of force corresponding to:"

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*